(12) United States Patent
Ohkawa

(10) Patent No.: US 7,607,799 B2
(45) Date of Patent: Oct. 27, 2009

(54) ILLUMINATION DEVICE AND ILLUMINATION UNIT

(75) Inventor: Shingo Ohkawa, Misato (JP)

(73) Assignee: Enplas Corporation, Kawaguchi (JP)

( * ) Notice: Subject to any disclaimer, the term of this patent is extended or adjusted under 35 U.S.C. 154(b) by 0 days.

(21) Appl. No.: 11/582,400

(22) Filed: Oct. 18, 2006

(65) Prior Publication Data
US 2008/0298060 A1    Dec. 4, 2008

(30) Foreign Application Priority Data
Oct. 18, 2005    (JP) .............................. 2005-302708

(51) Int. Cl.
*F21V 1/00*    (2006.01)
(52) U.S. Cl. ...................... 362/237; 362/240
(58) Field of Classification Search ......... 362/237–240, 362/246
See application file for complete search history.

(56) References Cited

U.S. PATENT DOCUMENTS

| 4,345,308 | A | * | 8/1982 | Mouyard et al. ............. 362/332 |
| 5,490,049 | A | * | 2/1996 | Montalan et al. ............ 362/240 |
| 5,526,236 | A | * | 6/1996 | Burnes et al. ................ 362/20 |
| 6,773,139 | B2 | * | 8/2004 | Sommers .................... 362/237 |
| 7,172,314 | B2 | * | 2/2007 | Currie et al. ................ 362/240 |

FOREIGN PATENT DOCUMENTS

| JP | 59-226381 | 12/1984 |
| JP | 63-6702 | 1/1988 |
| JP | 2002-49326 | 2/2002 |

\* cited by examiner

*Primary Examiner*—Ali Alavi
(74) *Attorney, Agent, or Firm*—Staas & Halsey LLP

(57) ABSTRACT

Light from a LED (point-like light source) is expanded smoothly to a desirable range at a high efficiency by a light flux control member. The light flux control member is provided with a lens portion located at a part corresponding to the LED and a mount portion (body portion) detachably supporting the lens portion. The lens portion has a back face provided with a recess located as to correspond to the LED. The recess expands light from the LED smoothly and efficiently to a broad range, bringing an emission from a front face (fore face) toward a wide range. A member-to-be-illuminated supplied with the emission is illuminated uniformly. LEDs and recesses are made enable to be arranged flexibly without need of an increased number of molds.

12 Claims, 21 Drawing Sheets

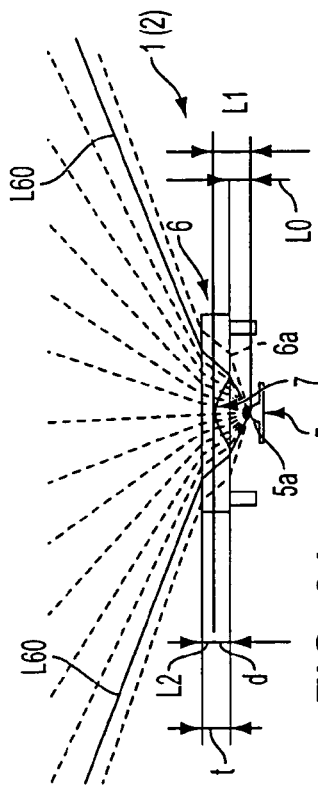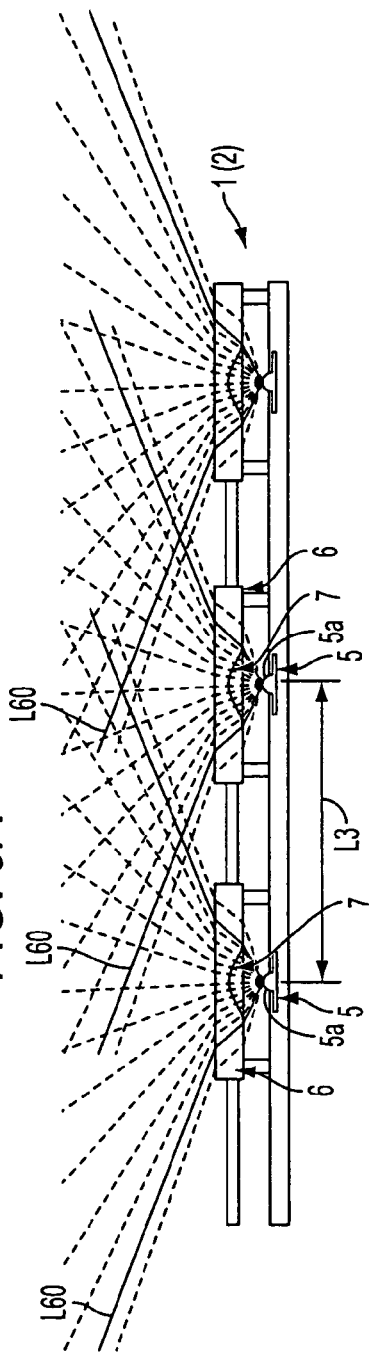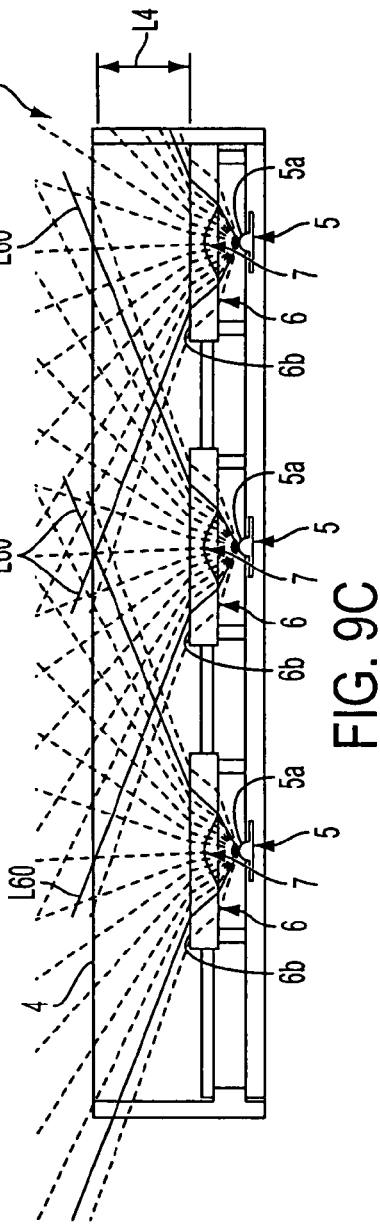

ILLUMINATION DEVICE AND ILLUMINATION UNIT

BACKGROUND

1. Field of Invention

The present invention relates to an illumination device and an illumination unit. The present invention is applied to illumination devices used for interior indirect illumination, ceiling illumination, floor illumination or for outdoor various adverting illumination, or to illumination units for surface light source devices for liquid crystal displays (LCDs) of television monitors.

2. Related Art

It has been known to employ a surface light source device provided with a plurality of light emitting diodes (LEDs) as an illumination means of LCD monitor of personal computers or television set. LED is a typical point-like light source. In general, a surface light source device is provided with a plurality of LEDs arranged like a matrix. Light from LEDs is enters into a light flux control member through a back face of the light flux control member and is emitted from a face opposite to the back face, being supplied to a LCD panel. The light flux control member has a shape like that of the LCD panel.

First Prior Art

FIG. 21 shows a surface light source device of the above type, which is according to a first prior art disclosed in Document 1 below.

Referring to FIG. 21, surface light source device 100 comprises a plurality of LEDs 101 and microlens array 102 arranged in one-to-one correspondence with the respective LEDs. Light from LEDs 101 is emitted toward a direction (upward) perpendicular to a plane (microlens array extending plane) via microlens array 102.

Second Prior Art

FIG. 22 shows an emission-display according to a second prior art which is disclosed in Document 2 below.

Referring to FIG. 22, emission-display 103 comprises LED 104, concave lens 105 and convex lens 106. Light from LED 104 is diffused by concave lens 105 and then gathered by convex lens 106, being emitted as illumination light roughly parallel to an optical axis of LED 104. It is noted that "optical axis" means a straight line corresponding to a light traveling direction at a center of a three-dimensional emission light flux from a point-like light source in the Specification.

Third Prior Art

FIG. 23 shows an illumination unit according to a third prior art which is disclosed in Document 3 below.

Referring to FIG. 23, illumination unit 107 comprises LED 108, condenser lens 110 and diffusing lens 111. Light from LED 108 is diffused by diffusing lens 111 after being gathered by condenser lens 110.

Fourth Prior Art

FIG. 20 shows an illumination unit according to a forth prior art which is disclosed in Document 3 below.

Referring to FIG. 20, illumination unit 1 comprises light flux control member 8 and LED 5 arranged at a back side of light flux control member 8. Light flux control member 8 has back face 8a which is opposite to LED 5 and provided with semi-sphere-like recess 60. Light from LED 5 is introduced into light flux control member 8 vis recess 60, being emitted from a face (emission face) 8b opposite to back face 8a.

Document 1; Tokkai-2002-49326
Document 2; Tokkai-sho-59-226381
Document 3; Tokkai-sho-63-6702

However, in the case of the first prior art, configuration of microlens array 102 varies discontinuously at a part corresponding to an intermediate region between LEDs 101 adjacent to each other, giving a sharp changing of emission intensity. As a result, rises a problem that a conspicuous bright-dark unevenness appears in the vicinity of a boundary between microlens arrays 102 adjacent to each other.

In the case of the second prior art, no planar element composed by connecting continuously a plurality of concave lenses 105. In addition, no planar element composed by connecting continuously a plurality of convex lenses 106. Therefore, it is difficult to output an illumination light flux having a large cross section. As a result, application to uses such as backlighting of LCD panel having a large area.

In the case of the third prior art, light from LED 108 is diffused by diffusing lens 111 after being gathered by condenser lens 110. Therefore, conspicuous brightness difference like that in the case of surface light source device 100 of the first prior art is avoided. However, rays from LEDs 108 adjacent to each other are not mixed easily. Therefore, if emitting colors of LEDs 108 adjacent to each other have differences, the differences appear in an output light of the illumination unit.

In the case of the forth prior art, relation between emission angle $\theta 1$ of light from LED 105 and emission angle $\theta 5$ of light from light flux control member 8 satisfies $\theta 5/\theta 1 > 1$ except for light having travelling directions near to "normal direction". This enables light from LED 5 to be emitted after being expanded by light flux control member 8 as shown in FIGS. 20 and 7. It is noted that definition of emission angles $\theta 1$ and $\theta 5$ is described later by referring to FIG. 3. In addition, normal direction is a direction vertical to a front face (emission face) of a light flux control member, according with optical axis L shown in FIG. 20.

However, since recess 60 gives a sharp edge (connecting portion between recess 60 and planar portion of back face 8a), light incident to the edge crosses over with light incident to in the vicinity of the edge after being transmitting through light flux control member, causing a ring-like bright part to be observed at a region in which said cross over occurs. In this meaning, it can not said that the forth prior art expands light from LED 5 smoothly.

In addition, in the forth prior art, a plurality of recesses 60 are formed on a single flat-plate-like light flux control member 8 at certain intervals corresponding to LEDs 5 as shown in FIG. 20. It should be noted that configuration of recesses 60 must be highly accurate. Besides, mass-productivity with a low cost is demanded. To answer this demand, injection molding is generally applied.

However, a problem arises related to injection molding if the forth prior art is employed. That is, changing of formation pitch of recesses 60 (corresponding to arrangement pitch of LEDs 5) is changed, a different mold must be prepared even though configuration of recess 60 is not changed. In other words, different molds are needed for different formation pitches of recesses 60. This gives an increased manufacturing cost.

As a result, layout variation flexibility of LEDs 5 and recesses 60 is limited in order to avoid mold cost increasing and flexible designing according to design conditions or using condition of illumination unit 1 is difficult to be performed in cases where the whole body of light flux control member 8 is produced as one member by injection molding according to conventional arts.

OBJECT AND SUMMARY OF INVENTION

A basic object of the present invention is to improve an illumination device emitting light from a point-like light source via a light flux control member emitting light from the point-like light source and an illumination unit employing the device as to allow lens portions controlling light direction to be manufactured independently for being mounted on the light flux control member.

8 and to be mounted

Another object of the present invention is to provide an illumination device capable of emitting uniform illumination light with a small two-dimensional brightness unevenness and an illumination unit employing the illumination device.

Still another object of the present invention is to enable layout of LEDs and lens portions (recesses) of a light flux control member to be flexible without an increased number of molds.

First, the present invention is applied to an illumination device emitting light from a point-like light source via a light flux control member.

According to a feature of the present invention, said light flux control member has a lens portion which is located as to correspond to said point-like light source and provided with a back face directed to said point-like light source and a front face opposite to the back face, and a body portion mounting said lens portion detachably, and said body portion being provided with a lens-portion-mounting-hole receiving and engaging with said lens portion, and, said lens portion being fixed to said body portion by rotation after said lens-portion-mounting-hole has engaged with said lens-portion.

It is noted that a plurality of point-like light sources, a plurality of lens portions and lens-portion-mounting-holes may be arranged. In this case, each of said lens portions and each of said lens-portion-mounting-holes are arranged as to correspond to each of said point-like light sources.

In addition, according an preferable embodiment, each of said lens portions includes a periphery-side circular portion, a back-face-side projection, a front-face-side projection, said back-face-side projection being formed on a back face side as to project radially outward beyond said periphery-side circular portion, and said front-face-side projection being formed on a front face side as to project radially outward beyond said periphery-side circular portion and being differently located as compared with said back-face-side projection to a direction of said rotation.

Said lens-portion-mounting-hole is formed so as to be fit into said periphery-side circular portion of said lens portion in a relatively rotatable manner, said body portion having at least one of a first projection-receiving-hole enabling said front-face-side projection to move from a side of said back face to a said of said front face and a second projection-receiving-hole enabling said back-face-side projection to move from the side of said front face to a side of said back face, said body portion being sandwiched by said front-face-side projection and said back-face-side projection of said lens portion from sides of said front face and said back face at least at a periphery part of said lens-portion-mounting-hole.

Further, when said lens portion is mounted to said body portion from a back side of said body portion, said lens portion is rotated with respect to said body portion so that said front-face-side projection is shifted with respect to said first projection-receiving-hole in a rotation direction to pinch-support said periphery-side circular portion of said lens-portion-mounting-hole of said body portion between said front-face-side projection and said back-face-side projection of said lens portion from front-and-back-sides, after said front-face-side projection of said lens portion and said first projection-receiving-hole of said body portion are aligned to each other and said periphery-side circular portion and said lens-portion-mounting-hole of said lens portion are aligned to each other, and further said lens portion has engaged with said body portion so that said front-face-side projection extrudes to a side of said front face of said body portion.

Alternatively, when said lens portion is mounted to said body portion from a front side of said body portion, said lens portion is rotated with respect to said body portion so that said back-face-side projection is shifted with respect to said second projection-receiving-hole in a rotation direction to pinch-support said periphery-side circular portion of said lens-portion-mounting-hole of said body portion between said front-face-side projection and said back-face-side projection of said lens portion from front-and-back-sides, after said back-face-side projection of said lens portion and said second projection-receiving-hole of said body portion are aligned to each other and said periphery-side circular portion and said lens-portion-mounting-hole of said lens portion are aligned to each other, and further said lens portion has engaged with said body portion so that said back-face-side projection extrudes to a side of said back face of said body portion.

In addition, according a mode, said light flux control member has a lens portion which is located as to correspond to said point-like light source and provided with a back face directed to said point-like light source and a front face opposite to the back face, and a body portion mounting said lens portion detachably, at least one of said front and back face of said lens portion being provided with a recess formed as to corresponding to said point-like light source, said recess being configured so that at least light emitted toward within a half-intensity-angular-range around a maximum-intensity-emission-direction from said point-like light source satisfies a condition shown below.

A satisfied condition is that relation between $\theta 1$ which is an emitting angle of light emitted from said point-like light source with respect to a normal direction of an emission face of said lens portion and $\theta 5$ which is an emitting angle of light emitted from said lens portion with respect to the normal direction keeps $\theta 5/\theta 1 > 1$ except for light emitted toward within an angular-neighborhood of said normal direction in the light emitted from said point-like light source, and another condition is that $\theta 5/\theta 1$ decreases gradually with increasing of $\theta 1$.

According another mode, in the first place, said light flux control member has a lens portion which is located as to correspond to said point-like light source and provided a body portion mounting said lens portion detachably, said lens portion being provided with a top portion extruding sideways, said body portion being provided with a lens-portion-mounting-hole receiving said lens portion and allowing the lens portion to be rotated, a back-face-side projection projecting toward inside of said lens-portion-mounting-hole and located on a back face side of said body portion and a front-face-side projection projecting toward inside of said lens-portion-mounting-hole and located on a front face side of said body portion.

In addition, a gap is formed between said back-face-side projection and said front-face-side projection as to receive said top portion of said lens portion and allow said top portion of said lens portion to be rotated, at least one of said back-face-side projection and said front-face-side projection being provided with a projection-receiving hole guiding said top portion of said lens portion to said gap.

Further to this, said front and back sides of said top portion are supported from front and back directions by said front-face-side projection and said back-face-side projection through rotation of said lens portion with respect to said body portion for shifting said top portion of said lens portion with respect to said projection-receiving hole after said top portion of said lens portion has been guided into said gap by said projection-receiving hole.

It is noted that at least one of said lens-portion-mounting-hole of said body portion and said lens portion may be provided with a rotation-stopping-projection, and at least the other of said lens-portion-mounting-hole of said body portion and said lens portion is provided with a rotation-stopping-recess which engages with said rotation-stopping-projection and regulates a rotation angle of said lens portion with respect to said body portion.

At least one of said lens-portion-mounting-hole of said body portion and said lens portion may be provided with a rotation-stopping-projection, and at least the other of said lens-portion-mounting-hole of said body portion and said lens portion is provided with a rotation-stopping-recess which engages with said rotation-stopping-projection and regulates a rotation angle of said lens portion with respect to said body portion.

At least one of a surface, which is opposite to said body portion, of said front-face-side projection and a surface, which is opposite to said body portion, of said back-face-side projection may include an inclined surface which provides friction force between said lens portion and said body portion so that said friction force increases gradually with rotation of said lens portion with respect to said body portion, and a periphery part of said lens-portion-mounting-hole may be got in contact with said front-face-side projection and said back-face-side projection by rotation of said lens portion with respect to said body portion, thereby effecting regulation of relative rotation angle of between said lens portion and said body portion.

At least one of said back-face-side projection, which projects toward inside of said lens-portion-mounting-hole of said body portion and is located at a back face side of said body portion, and said front-face-side projection, which projects toward inside of said lens-portion-mounting-hole of said body portion and is located at a front face side of said body portion, may have a surface which is opposite to said lens portion and includes an inclined surface which provides friction force between said lens portion and said body portion so that said friction force increases gradually with rotation of said lens portion with respect to said body portion, and a periphery part of said lens-portion-mounting-hole is got in contact with said front-face-side projection and said back-face-side projection by rotation of said lens portion with respect to said body portion, thereby effecting regulation of relative rotation angle of between said lens portion and said body portion.

In the above cases, said recess may have a first light entering surface and second light entering surface which are connected to each other by a connection portion giving a point of inflection.

The present invention is also applied to an illumination unit comprising an illumination device and a light diffusion member diffusing light from said illumination device. If so applied, said illumination device is any of the above ones.

According to the present invention, it is allowed to apply injection-molding only to production of lens portions which require a highly accurate configuration because lens portions are mounted on a body portion detachably.

Besides, the lens portions allow common use in illumination devices having different layouts of point-like light sources. Therefore, under different layout conditions of point-like light sources, production of the lens portions requires only one kind of mold for injection-molding them so far as lens portion configuration is kept constant, with the result that a reduced cost for molds and manufacturing of illumination devices can be aimed.

In addition, according to the present invention, a light flux from a point-like light source can be expanded broadly and effectively by a recess of a lens portion of a light flux control member, enabling the light flux control member to have an emission face providing an illumination light directed toward a broad range. Accordingly, if a plurality of point-like light sources are employed, rays from the individual point-like light sources tend to be mixed easily, and accordingly, if emission colors of the individual point-like light sources are different from each other, emission via a light flux control member can avoid from showing a conspicuous emission color unevenness effected by emission color unevenness of the individual point-like light sources, and further, emission brightness is uniformalized and illumination quality is improved.

Still further saying, according to the present invention, layout of lens portions (recesses) can meet that of point-like light sources and flexibility of layout of point-like light source is increased because lens portions are mounted to a body portion detachably.

BRIEF DESCRIPTION OF DRAWINGS

FIG. 4c is a partially enlarged illustration of FIG. 4a;

FIG. 5d is a cross section view along line E-E in FIG. 5a;

FIG. 6b is another illustration for illustrating how the lens portion engage with the lens-portion-mounting-hole of the mounting portion (body portion), showing another state that the lens portion has been rotated clockwise by a certain angle as compared with the above state shown in FIG. 6a;

FIG. 9a is a diagram illustrating a relation between lens portion 6 and LED 5;

FIG. 9b is another diagram illustrating a relation between lens portion 6 and LED 5;

FIG. 9c is still another diagram illustrating a relation between lens portion 6 and LED 5;

FIG. 13b is a cross section view of the lens portion along line B-B in FIG. 13a;

FIG. 14b is a cross section view of along line C-C in FIG. 14a;

FIG. 15b is a plan view for illustrating another state that the lens portion shown in FIG. 16a has been rotated with respect to the mounting portion (body portion) clockwise by a certain angle as compared with the above state shown in FIG. 15a;

FIG. 15d is a back side plan view for illustrating the state that the lens portion shown in FIG. 16a has been rotated with respect to the mounting portion (body portion) clockwise by the certain angle as compared with the above state shown in FIG. 15a;

EMBODIMENT

Figure 1:
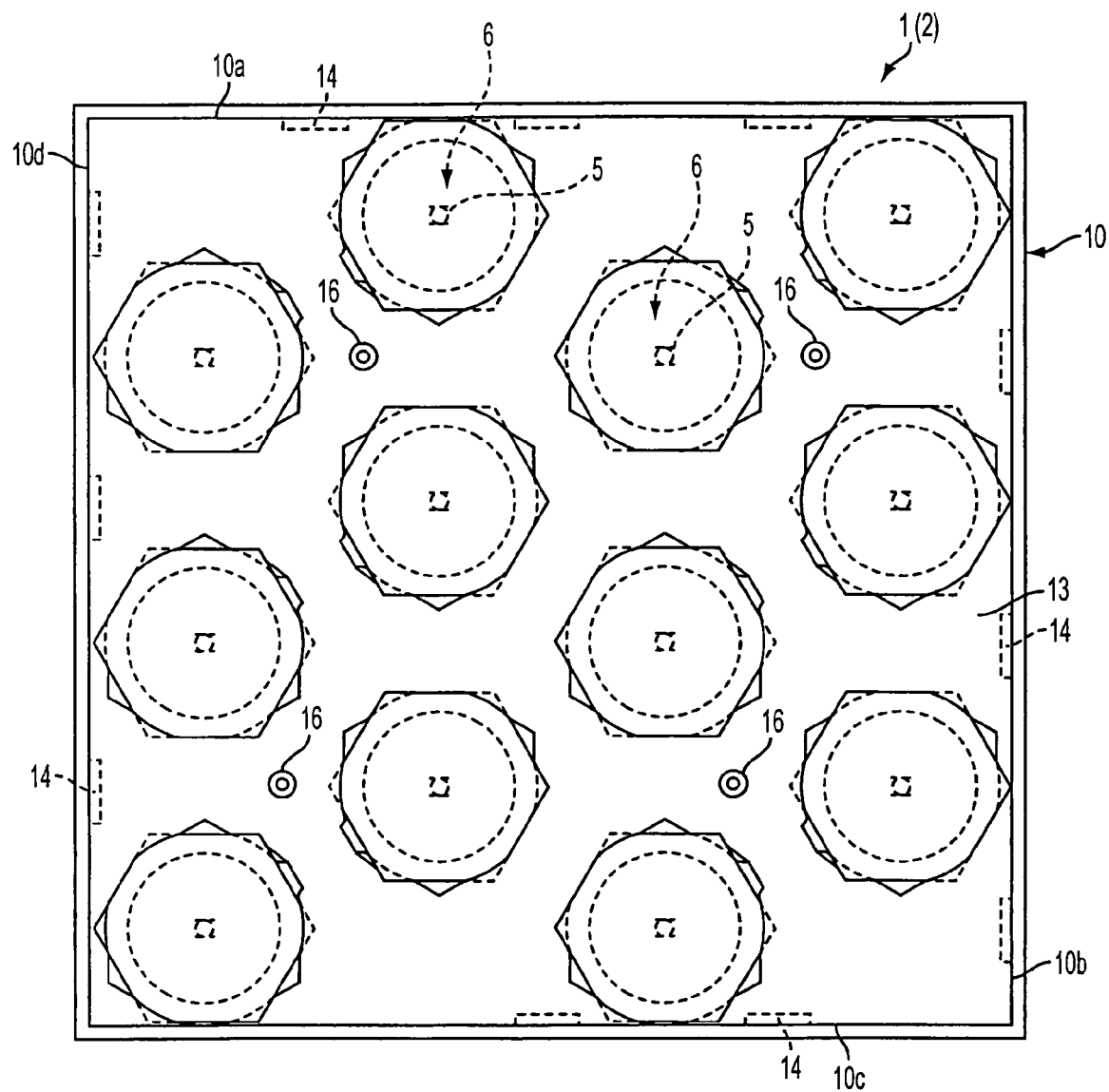
FIG. 1 is a plan view of an illumination device and an illumination unit including the same to which the present invention is applicable, with a member-to-be-illuminated and a light diffusion member being omitted.

Hereafter given is description with referring to the drawings on illumination devices and illumination units in accordance with the present invention.

<Outlined Structure of Illumination Device and Illumination Unit>

Figure 2:
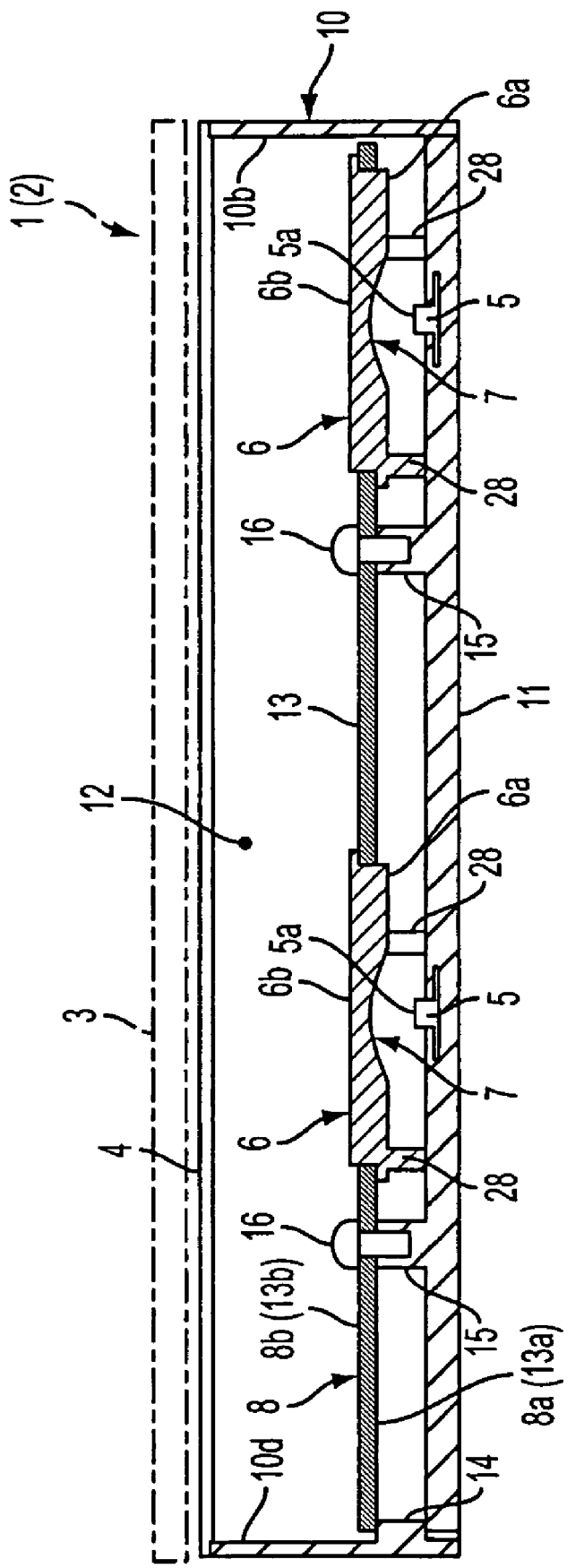
FIG. 2 is a cross section view of the illumination unit along line A-A in FIG. 1.
Figure 3:
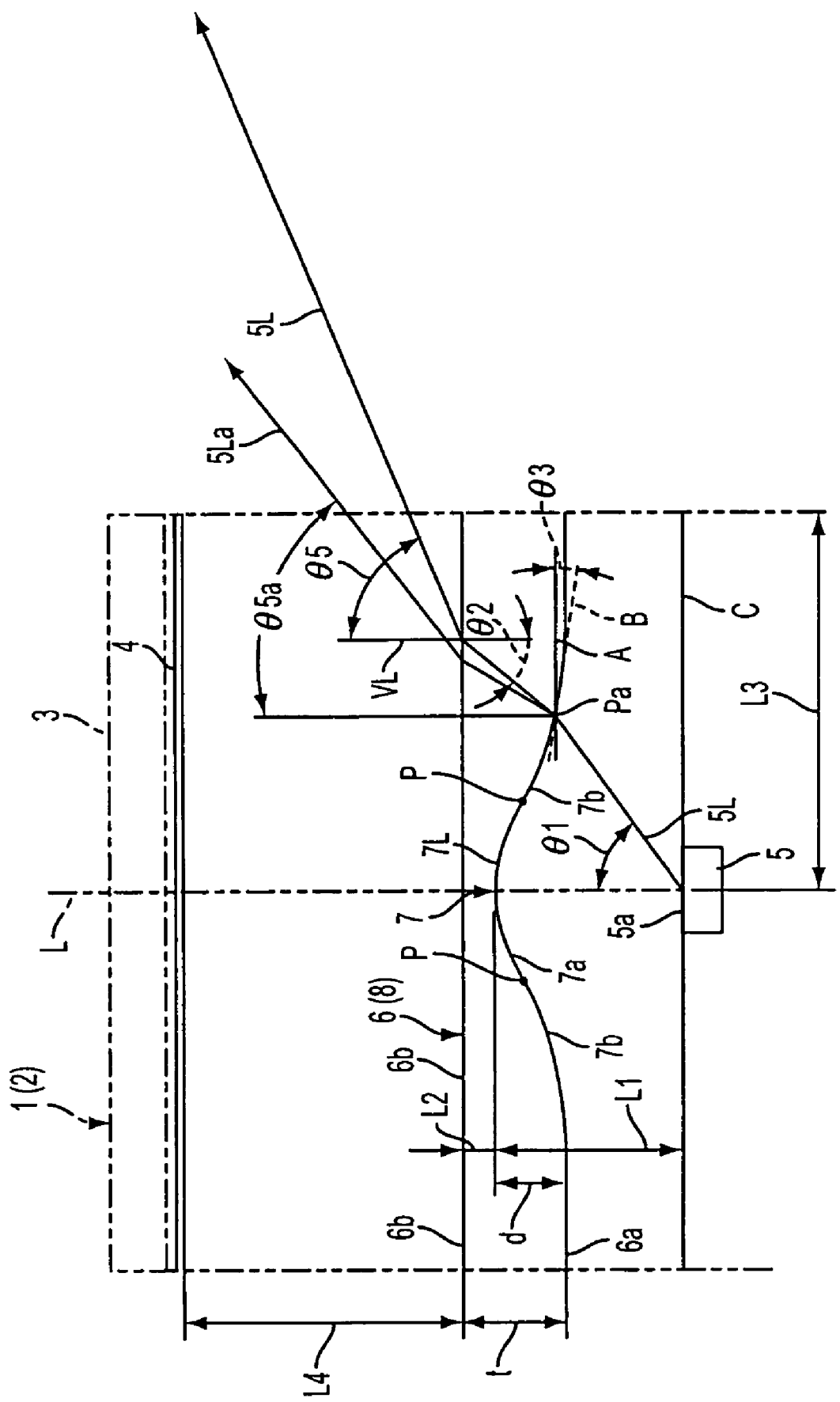
FIG. 3 is a partial cross section view of the illumination unit along a plane including an optical axis of a LED, giving a partially enlarged diagrammatic view of FIG. 2 for illustrating configuration of a recess of a lens portion.

FIGS. 1 to 3 illustrate illumination device 2 and illumination unit 1 including illumination device 2, which are according to an embodiment. FIG. 1 is a plan view in which member-to-be-illuminated 3 and light diffusion member 4 are omitted. FIG. 2 is a cross section view of illumination unit 1 along line A-A in FIG. 1. FIG. 3 is a partial cross section view of illumination unit 1 along a plane including an optical axis of LED 5, giving a partially enlarged diagrammatic view of FIG. 2 for illustrating configuration of recess of a lens portion 6.

As shown in FIGS. 1 to 3, illumination unit 1 is provided with plate-like light flux control member 8, LEDs 5 arranged at generally constant intervals inside of back face 8a of light flux control member 8 and light diffusion member 4 arranged outside of emission face (front face) 8b of light flux control member 8 distantly and opposite thereto. Light flux control member 8 has a planar shape like a rectangle. Member-to-be-illuminated 3 is, for example, a LCD panel. LEDs 5 is a typical example of point-like light source.

Illumination unit 1 is accommodated in case 10 opened upward. Light from LEDs 5 is supplied to member-to-be-illuminated 3 arrange outside (upper side in the illustration) via light flux control member 8 and light diffusion member 4. A plurality of LEDs 5 are mounted on bottom plate 11 at a certain pitch. Light diffusion member 4 is mounted as to close an opening portion 12 at an upper end of case 10 (See FIG. 2).

<Case>

As shown in FIGS. 1 and 2, case 10 has a planar shape like a rectangle, being configured like a box which has a certain depth and is opened upward. Case 10 has inner side faces 10a to 10d provided with a plurality of supporting projections 14 which support body portion 13 of light flux control member 8 from lower side. Body portion 13 functions as mount for mounting lens portions 6. In this sense, body portion 13 can be called mount portion.

Bottom plate 11 of case 10 includes a plurality of body portion holding pins 15 as a unified part thereof. Body portion holding pins 15 are position and hold body portion 13 at a certain distance from bottom pale 11. Body portion 13 is tightly fixed to body portion holding pins 15 by screws 16.

Lens portions 6 are mounted to body portion 13 fixed to bottom plate 11. Therefore, Distance between light flux control member 8 and LEDs 5 is maintained even if illumination unit 1 is put upside down in use, namely, lens portions 6 are located below LEDs 5 in use. In general, posture of illumination device 2 and illumination unit 1 of the embodiment is subject to no limitation of installing posture. An inner side face of case 10 may be processed as to have heightened light reflectivity or light absorptivity according to illumination conditions required.

Body portion 13 may be held in a way such that resin pushing-into-pins (not shown) and body portion holding pins 15 provided with holes to which spindle parts of pushing-into-pins are fit into are utilized. This way According to this way, body portion 13 is pinch-held between top portions of the pushing-into-pins and top portion of body portion holding pins 15 by pushing the spindle parts of the pushing-into-pins into holes of body portion holding pins 15.

<Light Flux Control Member>

Light flux control member 8 is provided with body portion 13 and lens portions 6 mounted on body portion 13 detachably. Thin plate-like body portion 13 is made of a material, for example, transparent resin such as PMMA (polymethyl methacrylate) or PC (polycarbonate), or transparent glass. Lens portions 6 are made of a transparent resin such as PMMA (polymethyl methacrylate) or PC (polycarbonate). Lens portions 6 are produced and configuration thereof is controlled at a high accuracy.

An outer periphery of body portion 13 is rectangular and generally uniform in thickness. In addition, body portion 13 has a plurality of lens-portion-mounting-hole 17. Lens portions 6 are received into lens-portion-mounting-holes 17 and engaged with them, being mounted on body portion 13. The numbers and positions of lens-portion-mounting-holes 17 are determined according to layout of LEDs 5. Position of each lens-portion-mounting-hole 17 corresponds to that of each LED 5. Laser machining or stamping may be applied for forming lens-portion-mounting-holes 17. It is noted that body portion 13 may be formed of a metal plate under some illumination conditions. In other words, body portion 13 may be not capable of transmitting light.

Each Lens portion 6 is a thin plate-like segment of a hexagonal planar shape as shown in FIGS. 5a to 5d, being provided with projection (flange portions) 20 at front face side and projection (flange portions) 21 at back face side. Thickness of each lens portion 6 is large at periphery thereof and small at a center portion thereof. Thickness at periphery is greater that of body portion 13 by thickness of projections 20 and 21 (See FIG. 2).

Figure 5A:
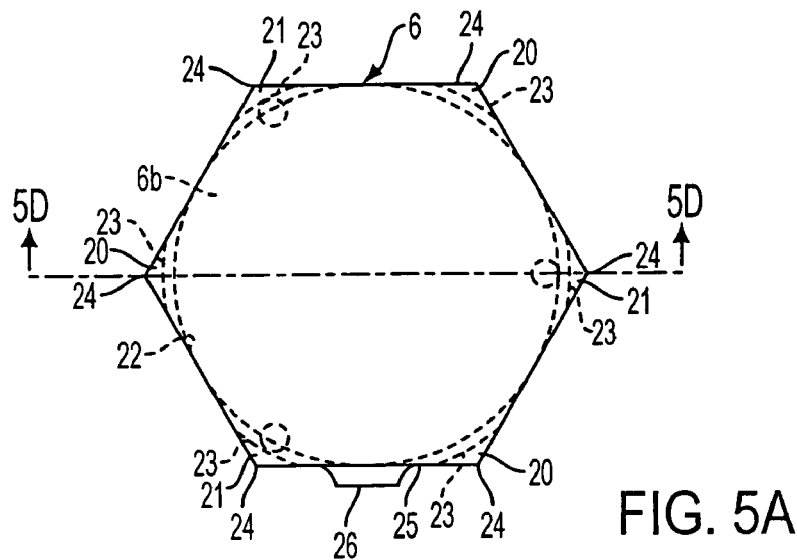
FIG. 5a is a plan view of a lens portion of a light flux control member.
Figure 5B:
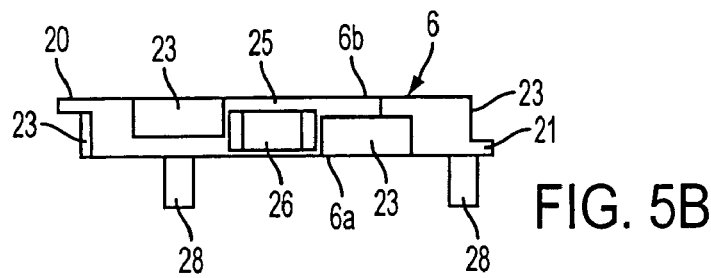
FIG. 5b is a side view of the lens portion of the light flux control member.
Figure 5C:
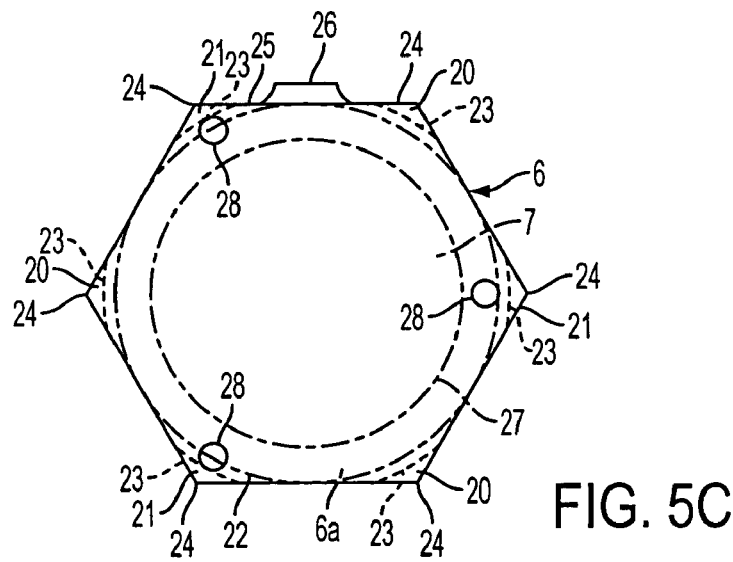
FIG. 5c is a back side plan view of the lens portion of the light flux control member.

Seeing each lens portion 6 in detail, there are periphery-side circular portions 23 which are concentric circles of inscribed circles 22 of hexagonal and has a radius greater that of inscribed circles 22 and smaller than that of circumscribed circle, as shown in FIGS. 5a and 5c. Periphery-side circular portion 23 is formed as to correspond to the respective six vertex portions 24 of each hexagonal.

Six periphery-side circular portions 23 are formed as to have alternating positions at front face side and back face side of lens portion 6. If periphery-side circular portions 23 are formed at the side of front face 6b of lens portion 6, vertex portions 24 of hexagonal at the side of back face 6a give projections (back-face-side projections 21) which are generally triangular thin plates protruding radially outward with respect to periphery-side circular portion 23.

If periphery-side circular portions 23 are formed at the side of back face 6a of lens portion 6, vertex portions 24 of hexagonal at the side of front face 6b give projections (front-face-side projections 20) which are generally triangular thin plates protruding radially outward with respect to periphery-side circular portion 23.

Rotation-stopping-projection 26 is formed on one side face 25 of lens portion 6 as to intrude the outside of side face 25. Rotation-stopping-projection 26 looks generally rectangular as viewed from sides of front face 6b and side face 25, respectively.

As shown in FIGS. 5b and 5c, back faces 6a of lens portions 6 are provided with supporting pins 28 locations of which are outside of region 27 for light flux control (i.e. lens region) and correspond to locations of back-face-side projections 21. This distance between light emitting parts of LEDs 5 mounted of bottom plate 11 and lens portions 6 is kept constant.

Recess 7 formed on back face 6a consists of aspheric first light entering surface 7a a center of which corresponds to optical axis L of LED 5 and second light entering surface 7b smoothly connecting a periphery of first light entering surface 7a to the side of back face 6a. First light entering surface 7a gives a concave curved surface which is projecting-curved as to be remote from LED 5, being symmetric with respect to optical axis L.

Second light entering surface 7b gives a surface projecting-curved to a generally reversed direction as compared with first light entering surface 7a. As a result, recess 7 has a point of inflection P at a connection portion between first and second light entering surfaces 7a and 7b. Intensity of light from LED 5 is the maximum on optical axis L of LED 5.

LED 5 has light emitting portion 5a perpendicular to optical axis L. A horizontal plane passing emitting portion 5a is defined as reference plane C. Light 5L is a ray generally representing light emitted from LED 5. Light 5L is incident to lens portion 6 at Pa at which profile 7L of recess 7 and the light cross. Line A is a straight line which passes Pa and is parallel with reference plane C.

Tangent B shown in FIG. 3 is a tangent with respect to profile 7L of recess 7 at position Pa. Tangent B makes angle $\theta 3$ with respect to A. Angle $\theta 2$ is an angle of inner-incidence of light 5L travelling within lens portion 6 to light emission face 6b. Inner-incidence angle $\theta 2$ is an angle of light 5L with respect to normal VL of emission face 6b. In FIG. 5, angle $\theta 5$ is an emission angle of light 5L from emission face 6b. Emission angle $\theta 5$ is an angle of light 5L on being emitted from emission face 6b with respect to normal VL of emission face 6b.

Recess 7 shown in FIG. 3 is formed as to satisfy the following Configuration Condition.

Configuration Condition; At least light emitted toward within a "certain angle range" including a range from "half-intensity-direction" to a "maximum-intensity-emission-direction" in the light emitted from LED 5 satisfies a condition that relation between $\theta 1$ and $\theta 5$ keeps $\theta 5/\theta 1 > 1$ except for light emitted toward within an angular-neighborhood of the normal (optical axis L in FIG. 3) and $\theta 5/\theta 1$ decreases gradually with increasing of $\theta 1$ (See curve 30 in FIG. 7).

It is noted that "maximum-intensity-emission-direction" is a direction (along optical axis L) to which LED light of the maximum-intensity is emitted. "Half-intensity-direction" is a LED light emitting direction to which light of a half the maximum-intensity is emitted. In addition the above "certain angle range" is an angular range of $\theta 1 < \alpha 1$ in FIG. 7.

Figure 7:
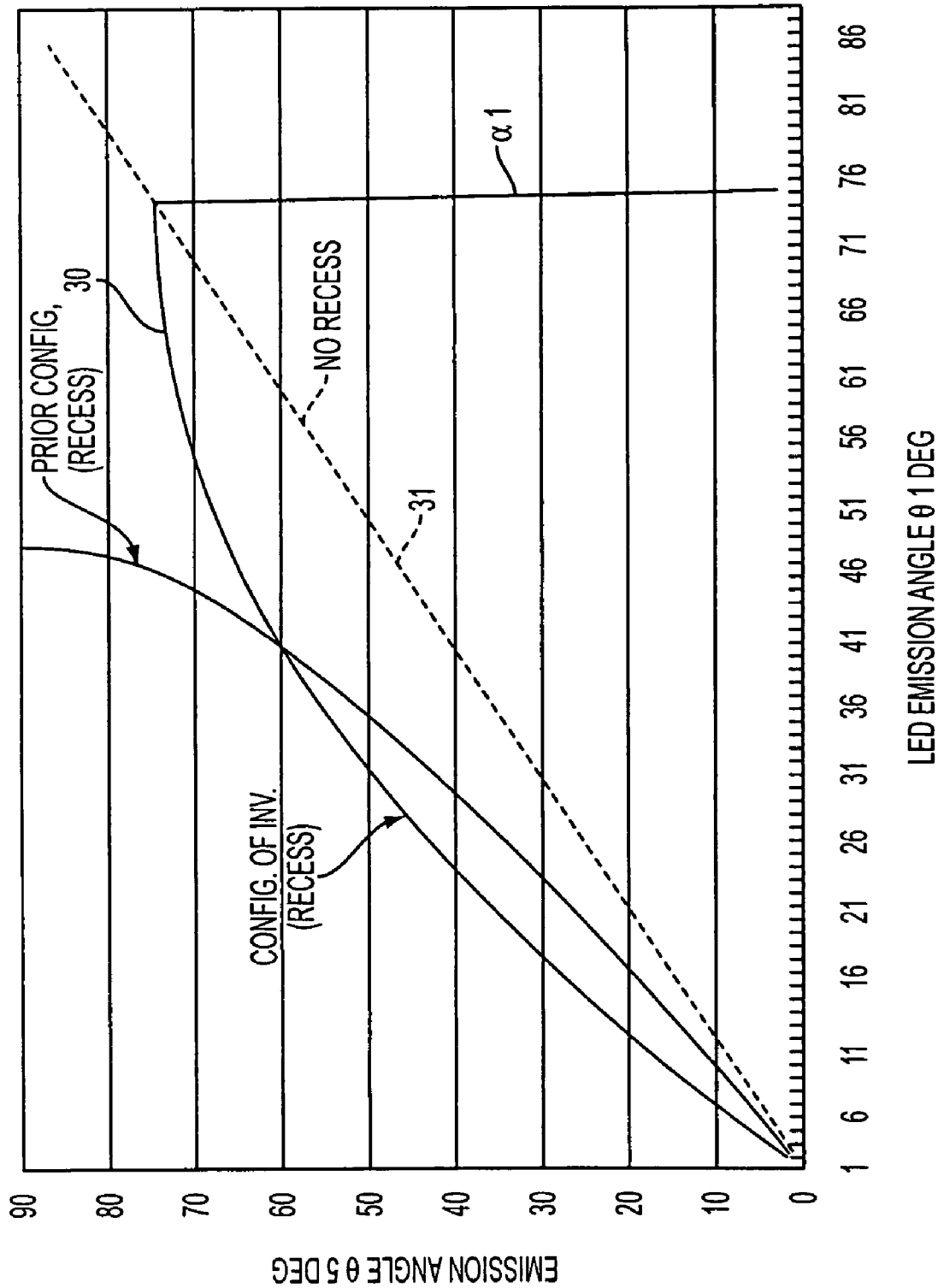
FIG. 7 is a graph illustrating a relation between LED emitting angle θ1 and emitting angle θ5 of light flux control member (lens portion)

It is noted that dotted line 31 shown in FIG. 7 is a line showing $(\theta 5/\theta 1) = 1$. Providing refractive index of lens portion 6 is n, θ2 and θ3 can be expressed the following Formula 1 and Formula 2. The above "angular-neighborhood" is preferably, for example, −5°<θ1<+5°.

$$\theta2=\sin^{-1}(\sin\theta5/n) \quad \text{(Formula 1)}$$

$$\theta3 = \tan^{-1}\left[\frac{(\sin\theta1 - n\cdot\sin\theta2)}{(\cos\theta1 - n\cdot\cos\theta2)}\right] \quad \text{(Formula 2)}$$

Relation between θ3 and θ1 is as follows. θ3 gets greater gradually with increasing of θ1 until θ1=θ3=α2 and then θ3 gets smaller gradually with increasing of θ1 in a range of θ1>α2. This variation is shown by curve 32 in FIG. 8.

Next, described are effects of recess 7 of lens portion 6. As shown in FIG. 3, light 5L from LED 5 is enters into lens portion 6 through recess 7. This incidence enables a light flux represented by light 5L to have an expanded traveling direction as compared in a case where back face 6a is "straight flat face" (i.e. without recess), being outputted.

It is noted that this imaginary "straight flat face" is called "imaginary plane". A case in which back face 6a is replace by imaginary plane is simply called "imaginary case". Emission angle in this imaginary case is illustrated by θ5a in FIG. 3.

As shown in FIG. 3, there is a relation of θ5a<θ5, which expresses a light travelling direction expanding effect of lens portion 6. This effect gives a basic advantage to the embodiment.

It is needless to say that refraction on incidence to recess 7 of lens portion 6 from an inner space (air) and on incidence to an outer space (air) from emission face 6b of lens portion 6 occurs according to well-known Snell's Law.

Figure 4A:
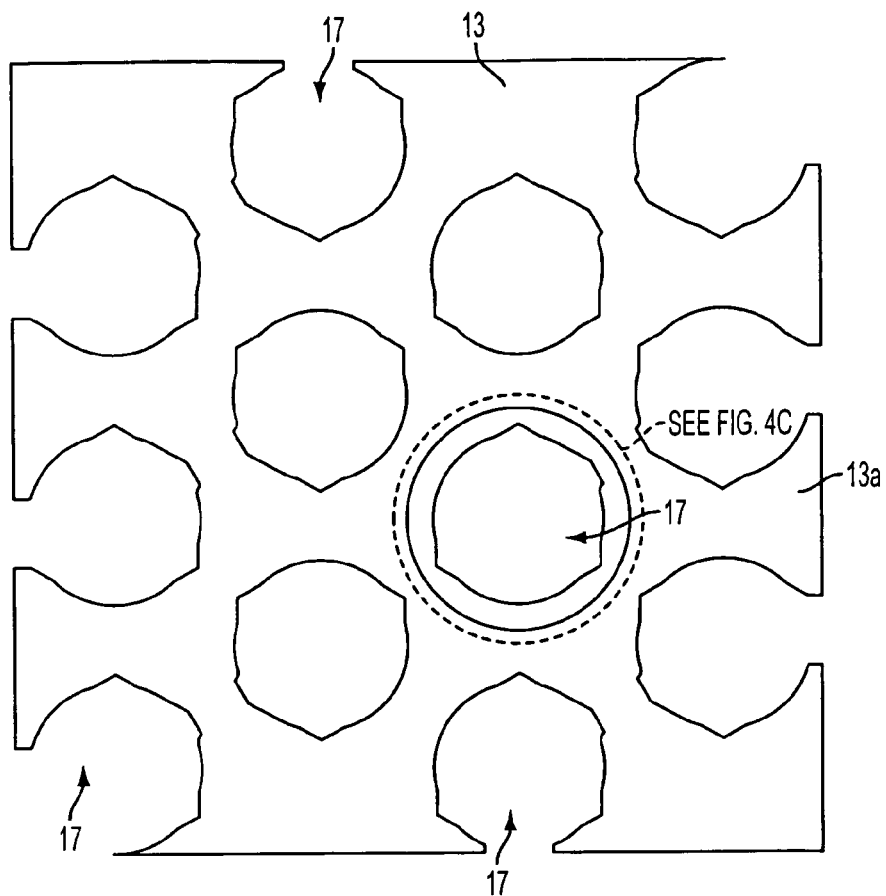
FIG. 4a is a plan view of a mounting portion (i.e. body portion) of a light flux control member.
Figure 4B:
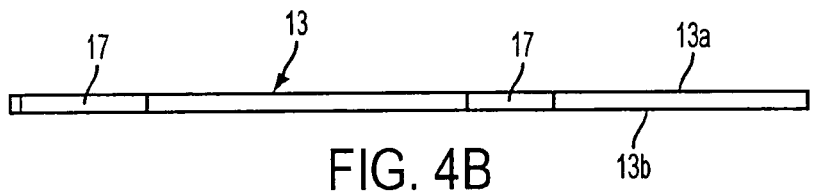
FIG. 4b is a side view of the mounting portion (i.e. body portion) of the light flux control member.
Figure 4C:
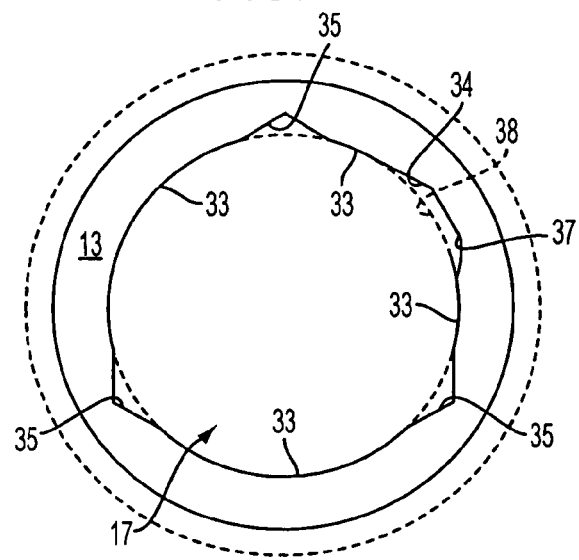

As shown in FIGS. 4a and 4c, lens-portion-mounting-hole 17 of body portion 13 allows to be mounted from the side of back face 13a of lens portion 6. Lens-portion-mounting-hole 17 is provided with circular hole portion 33, rotation-stopping recess 34 and projection-receiving hole (first projection-receiving hole) 35. Circular hole portion 33 corresponds to periphery-side circular portion 23 of lens portion 6. Rotation-stopping recess 34 fitting-into-engages with rotation-stopping projection 26 of lens portion 6. Projection-receiving hole (first projection-receiving hole) 35 fitting-into-engages with front-face-side projections 20 of lens portion 6.

Figure 6A:
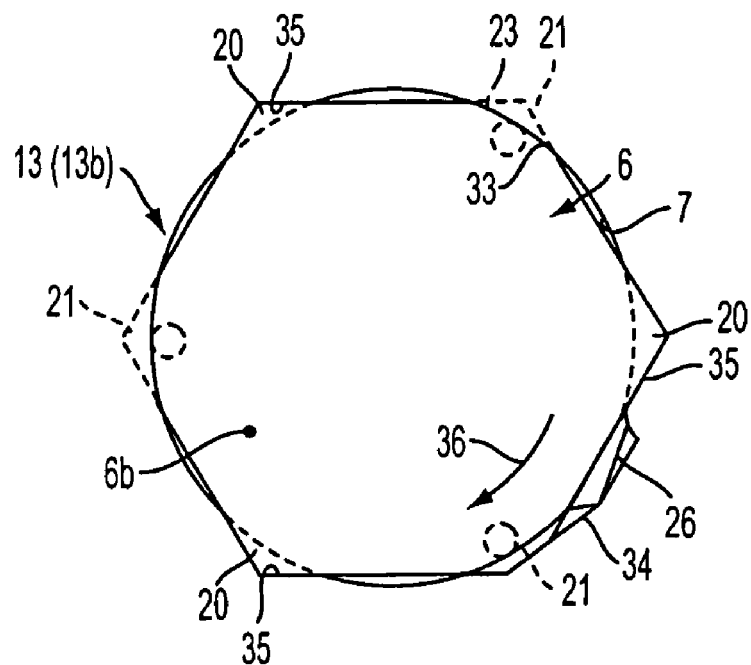
FIG. 6a is an illustration for illustrating how a lens portion engage with a lens-portion-mounting-hole of a mounting portion (body portion), showing a state that the lens portion has engaged with the lens-portion-mounting-hole.

Rotation-stopping recess 34 is formed like an arc along inscribed circle 38 of lens-portion-mounting-hole 17 as to cause lens portion 6 to be stop rotating clockwise by that rotation-stopping projection 26 of projections 13 abuts periphery-direction-end 37 (See FIG. 6b) when lens portion 6 is rotated by a certain angle, for example, 30° clockwise in FIG. 6a (in a direction shown by arrow 36).

Figure 6B:
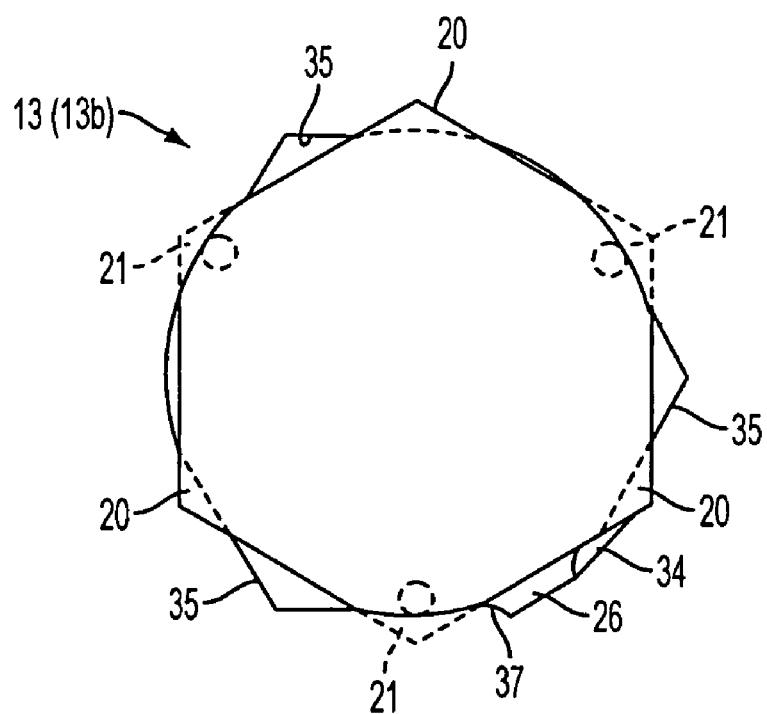

FIGS. 6a and 6b are illustrations for illustrating how to engage lens portion 6 with lens-portion-mounting-hole 17 of body portion 13.

FIG. 6a is a plan view showing a state that lens portion 6 has been fit into lens-portion-mounting-hole 17 from the side of back face 13a. FIG. 6b is an illustration for illustrating another state that lens-portion 6 has been rotated clockwise by a certain angle in a direction shown by arrow 36 in FIG. 6a and mounted on lens-portion-mounting-hole 17 of body portion 13 after being fit into lens-portion-mounting-hole 17 from the side of back face 13a.

First, as shown in FIG. 6a, front-face-side projections 20 of lens portion 6 is aligned with first projection-receiving hole 35 of body portion 13 and rotation-stopping projection 26 of lens portion 6 is aligned with rotation-stopping recess 34 of body portion 13, and then periphery-side circular portion 23 is of lens portion 6 is engaged with circular hole portion 33 of body portion 13.

Then lens portion 6 is pushed into lens-portion-mounting-hole 17 of body portion 13 (See FIG. 4) until front-face-side projections 20 intrudes to the side of front face 13b of body portion 13 (upper side) and back-face-side projection 21 abuts the side of back face 13a of body portion 13 (lower side).

Next, as shown in FIG. 6b, lens portion 6 is rotated by a certain angle clockwise (in a direction shown by arrow 36 in FIG. 6a), light when rotation-stopping projection 26 of projection 13 abuts periphery-direction-end 37 of rotation-stopping recess 34, with the result that rotation of lens portion 6 relative to body portion 13 is stopped.

Here, front-face-side projections 20 of lens portion 6 is shifted from first projection-receiving hole 35 and body portion 13 is pinch-held by front-face-side projections 20 and back-face-side projection 21 of body portion 13 from both sides. This causes lens portion 6 is mounted on body portion 13.

Thus front-face-side projections 20 of lens portion 6 is prevented from escaping from projection-receiving hole 35 and from dropping out of body portion 13 by regulating rotation position of lens portion 6 by rotation-stopping projection 26 and rotation-stopping recess 34.

In addition, lens portion 6 is accurately positioned with respect to body portion 13 by having rotation-stopping projection 26 abut periphery-direction-end 37 of rotation-stopping recess 34 as done in the embodiment. Therefore, mounting accuracy is improved as compared with a case where lens portion 6 is regulated with respect to body portion 13 by friction resistance of a sliding portion.

It is noted that the shown shapes of lens-portion-mounting-hole 17 and lens portion 6 (planar hexagonal, positions of front-face-side projections 20 and back-face-side projections 21) are merely examples.

Figure 5D:
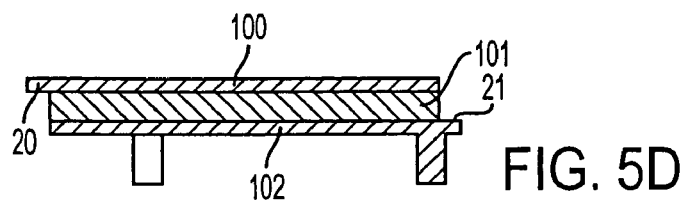

FIG. 5d is a cross section view along line E-E in FIG. 5a. General conditions are descried below by providing that three layers are set by division along thickness direction.

Structure is enough so far as body portion 13 is pinch-held at a position corresponding to second layer 101 by first and third layers 100, 102 of lens portion 6 by front-face-side projections 20 and back-face-side projection 21 formed at first layer 100 or third 102 of lens portion 6 when lens portion 6 is rotated with respect to body portion 13 by a certain angle after being fit-into lens-portion-mounting-hole 17.

Example of Determined Dimension of Parts of Illumination Device and Illumination Unit FIG. 9a is a diagram illustrating a relation between lens portion 6 and LED 5 and FIG. 9b is another diagram illustrating a relation between lens portion 6 and LED 5. FIG. 9c is still another diagram illustrating a relation between lens portion 6 and LED 5.

Referring to FIGS. 9a to 9c, recess 7 has a greatest diameter (diameter of the most outer periphery of second light entering surface 7b), depth d and configuration of first and second light entering surfaces 7a, 7b, which are respectively determined (See FIG. 3) depending of emitting characteristics of LED 5 (diverging angle of light flux; expressed by a value of θ1 giving half-intensity-angle) and distance L0 from emitting portion 5a of LED 5 and back face 6a of lens portion 6 (length along a central line of light flux).

Figure 8:
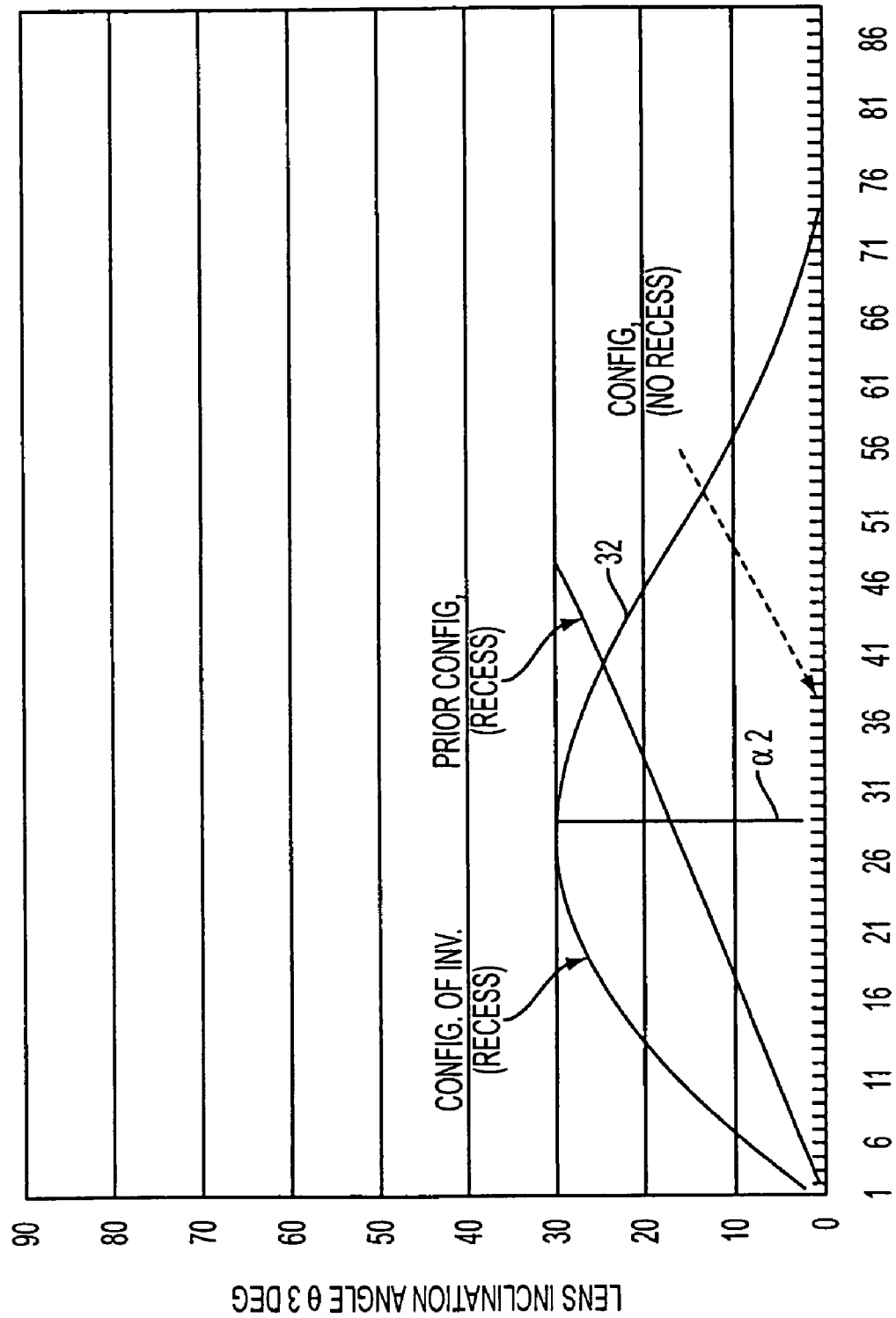
FIG. 8 is a graph illustrating a relation between LED emitting angle θ1 and lens face inclination angle θ3 of light flux control member (lens portion)

An edge of second light entering surface 7b is connected with generally planar back face 6a smoothly, as shown in FIG. 3, at a position to which light giving θ1 approximately equal to 75° (See curve 32 in FIG. 8).

Here, L1 is distance (dimension along a center line of light) from the deepest portion of recess 7 of lens portion 6 to emitting portion 5a of LED 5 as shown in FIG. 9a.

If distance L1 is too small, performance of LED 5 as a point-like light source is not utilized and brightness unevenness is apt to be caused easily by manufacturing errors or assembling errors of components of illumination device 2 and illumination unit 1.

Thus it is preferred to determine distance L1 so that performance of LED 5 as a point-like light source is efficiently utilized and brightness unevenness hardly occurs.

In FIG. 9a, depth p of lens portion 6 is equal to sum of thickness L2 of lens portion 6 at position of recess 7 and depth d of recess 7 (L2+d). Dimension L2 enough small is set so that troubles such as welds are not caused, under consideration of fluidity of resin in injection molding.

In FIG. 9b, the numbers of LEDs 5 and lens portions 6 and pitch L3 are preferably determined under consideration of illumination intensity demanded and emitting luminance of LED 5.

In illumination unit 1 shown in FIG. 9c, dimension L4 from front face 6b of lens portion 6 to light diffusion member 4 is determined so that rays from LEDs 5 adjacent to each other are mixed and light unevenness (unevenness of individual LEDs 5 in brightness or emitting color) is not conspicuous.

According to the embodiment, the above dimension L4 is determined so that light L60, included in the emission of LED 5, giving θ1=60° comes to just above an adjacent LED 5 (on the center line of the flux of LED 5) at a lower face of light diffusion member 4.

Example of Recess of Lens Portion

Referring to FIG. 3 showing configuration of recess 7 of lens portion 6, first light entering surface 7a generally corresponds to an angle range (angle range in which θ1 is smaller about 30°) along curved part as shown by curve 32 in which θ3 increases with increasing of θ1.

Second light entering surface 7b generally corresponds to an angle range (angle range in of θ1 from about 30° to 75°) as shown by curve 32 in FIG. 8 where θ3 decreases with increasing of θ1.

A vertex of curved part at which curve 32 in FIG. 8 changes from increasing to decreasing (angular position giving θ=about 30°) gives a point of inflection connecting first light entering surface 7a with second light entering surface 7b.

It is noted that recess 7 is configured so that θ3 is about 30° at a position where θ1 is about 30° in the embodiment.

It should be noted that "curved-like" includes not only smooth curve but also successive micro straight lines looking totally like a curve and approximately smooth curve including a straight line part.

If recess 7 is configured as above, emission angle θ5 from emission face 6b increases from 0° to about 75° gradually and smoothly according to an upward-convex curve 30 as shown in FIG. 7.

In addition, curve 30 accords at 75° with straight line 31 expressing a relation between θ1 and θ1 in a case where no recess 7 is formed (the foresaid imaginary case).

It is noted that curve 30 showing θ5 of light flux control member 4 provided with recess 7 can include a straight line part so far as curved-like configuration upward-convex is depicted as a whole. In FIGS. 7 and 8, PRIOR CONFIGURATION RECESS is recess 60 of light flux control member 8 shown in FIG. 20.

<First Modification of Light Flux Control Member>

Although the above light flux control member 8 described with referring to FIG. 6 employs lens portion 6 which is mounted on body portion 13 from the side of back face 13a, this is merely an example. Lens portion 6 may be mounted on body portion 13 from the side of front face 13b.

Figure 10A:
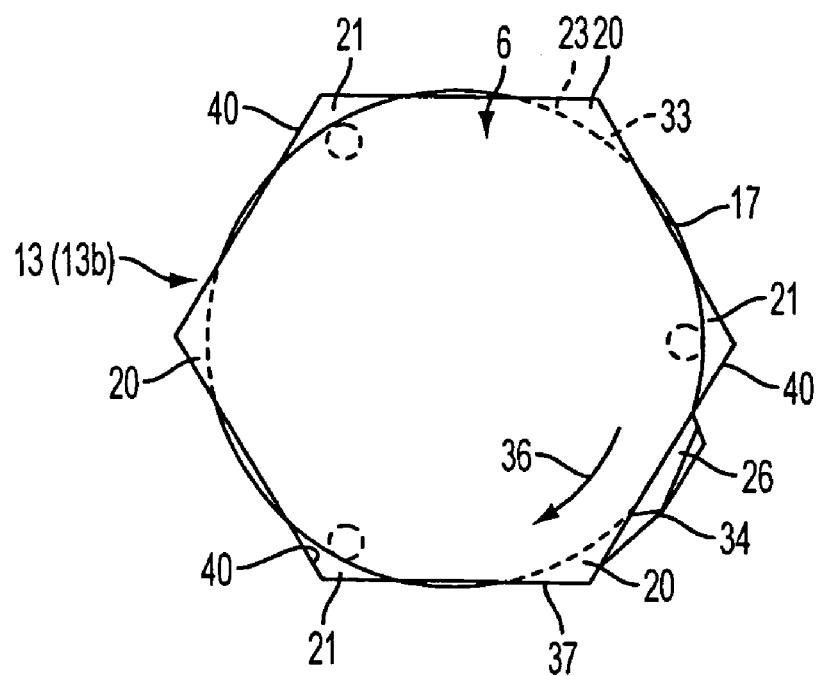
FIG. 10a is a diagram illustrating a first engaging state of a lens portion and a mounting portion (body portion) employed in a first modification of light flux control member.
Figure 10B:
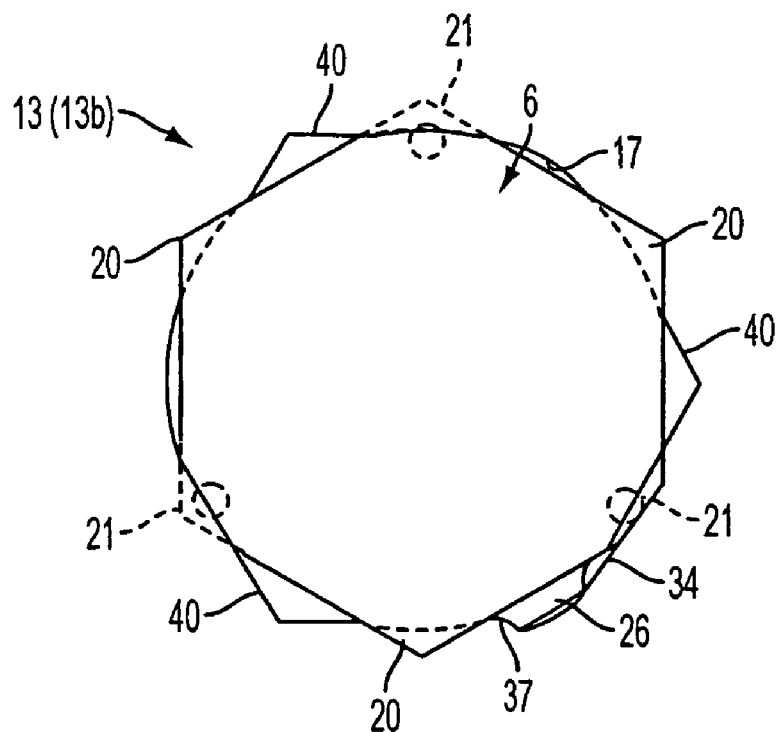
FIG. 10b is a diagram illustrating a second engaging state of the lens portion and the mounting portion (body portion) employed in the first modification of light flux control member.

FIG. 10a is a diagram illustrating a first engaging state of a lens portion and a mounting portion (body portion) employed in a first modification of light flux control member. FIG. 10b is a diagram illustrating a second engaging state of the lens portion and the mounting portion (body portion) employed in the first modification of light flux control member.

As shown in FIG. 10a, lens-portion-mounting-hole 17 of body portion 13 allows lens portion 6 to be mounted from the side of front face 13b of body portion 13. Lens-portion-mounting-hole 17 is provided with circular hole portion 33, rotation-stopping recess 34 and projection-receiving hole (second projection-receiving hole) 40.

Circular hole portion 33 corresponds to periphery-side circular portion 23 of lens portion 6. Rotation-stopping recess 34 fitting-into-engages with rotation-stopping projection 26 of lens portion 6. Projection-receiving hole (second projection-receiving hole) 40 fitting-into-engages with back-face-side projections 21 of lens portion 6.

It is noted that rotation-stopping recess 34 of body portion 13 is formed like an arc along circular hole portion 33 of lens-portion-mounting-hole 17 as to cause lens portion 6 to be stop rotating clockwise by that rotation-stopping projection 26 of projections 13 abuts periphery-direction-end 37 (See FIG. 10b) when lens portion 6 is rotated by a certain angle, for example, 30° clockwise in FIG. 10a (in a direction shown by arrow 36).

FIGS. 10a and 10b are illustrations for illustrating how to engage lens portion 6 with lens-portion-mounting-hole 17 of body portion 13.

FIG. 10a is a view showing a state that lens portion 6 has been fit into lens-portion-mounting-hole 17 from the side of front face 13b. FIG. 10b is an illustration for illustrating another state that lens-portion 6 has been rotated clockwise and mounted on lens-portion-mounting-hole 17 of body portion 13 after being fit into lens-portion-mounting-hole 17 from the side of front face 13b.

First, as shown in FIG. 10a, back-face-side projection 21 of lens portion 6 is aligned with projection-receiving hole 40 of body portion 13 and rotation-stopping projection 26 of lens portion 6 is aligned with rotation-stopping recess 34 of body portion 13, and then periphery-side circular portion 23 of lens portion 6 is engaged with lens-portion-mounting-hole 17 of body portion 13.

Then lens portion 6 is pushed into lens-portion-mounting-hole 17 from the side of front face 13b until back-face-side projection 21 of lens portion 6 intrudes (See FIGS. 2 and 4b) to the side of back face 13b (lower face side) and front-face-side projections 20 of lens portion 6 abuts the side of front face 13b (upper face side).

Next, as shown in FIG. 10b, lens portion 6 is rotated by a certain angle clockwise (in a direction shown by arrow 36 in FIG. 10a), light when rotation-stopping projection 26 of projection 13 abuts periphery-direction-end 37 of rotation-stopping recess 34, with the result that rotation of lens portion 6 relative to body portion 13 is stopped.

Here, BACK-face-side projections 21 of lens portion 6 is shifted from projection-receiving hole 40 and body portion 13 is pinch-held by front-face-side projections 20 and back-face-side projection 21 from both sides. This causes lens portion 6 to be mounted on body portion 13.

<Second Modification of Light Flux Control Member>

Figure 11A:
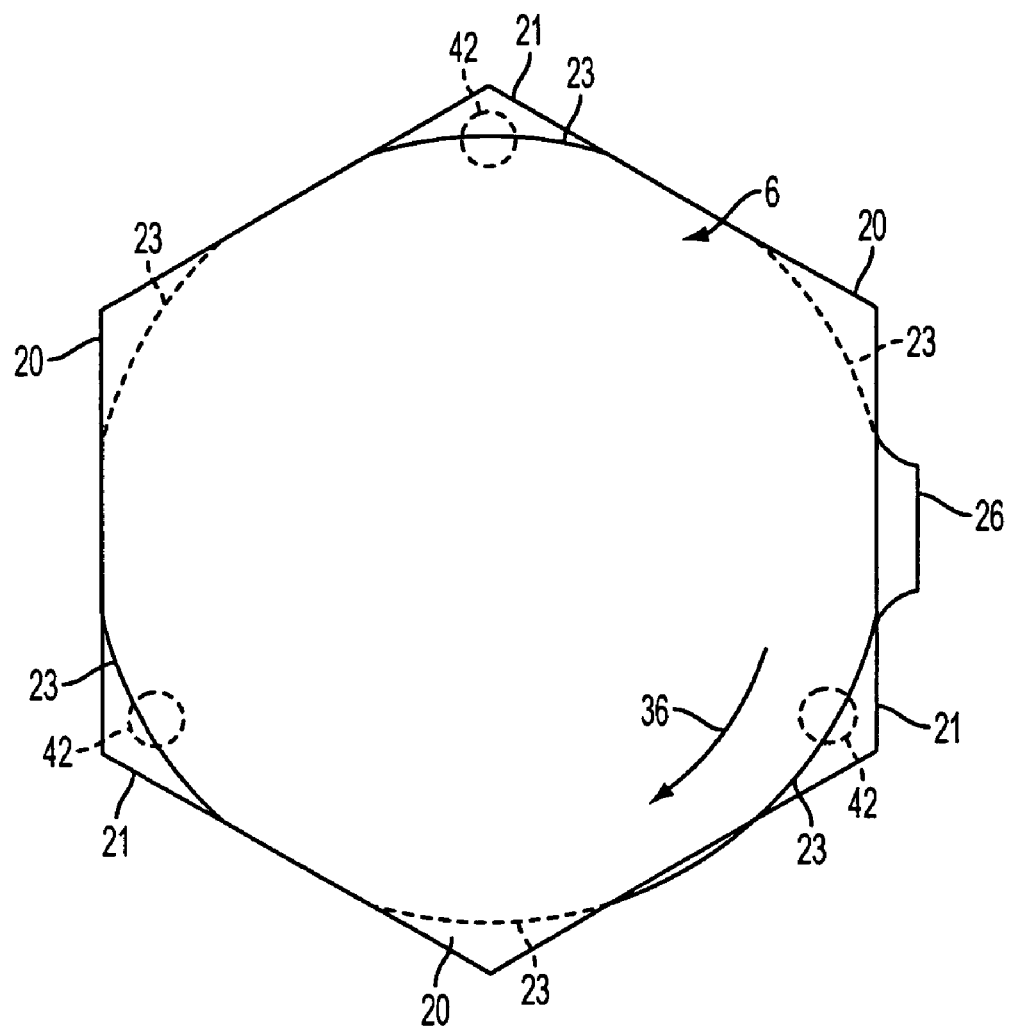
FIG. 11a is a plan view of a lens portion employed in a second modification of light flux control member.
Figure 11B:
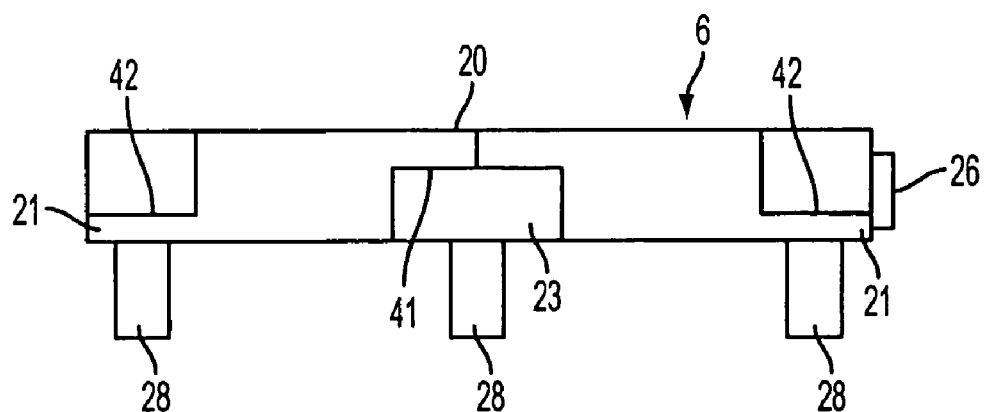
FIG. 11b is a side view of the same lens portion.

FIGS. 11a and 11b show light flux control member 8 (in particular, lens portion 6) employed in a second modification. Lens portion 6 in the second modification has a front-face-side projection 20 a lower face (opposite to the side of body portion 13) of which is a slope 41 so that thickness of front-face-side projection 20 increases clockwise away (rotation direction shown by arrow 36) from down stream side to up stream side.

In addition, back-face-side projection 21 has a upper face (opposite to the side of body portion 13) which is a slope 42 such that thickness of back-face-side projection 21 increases clockwise away (rotation direction shown by arrow 36) from down stream side to up stream side.

In the case of thus structured lens portion 6, slope 41 of front-face-side projection 20 rubs front face 13b of body portion 13 as shown in FIG. 11a when lens portion 6 is rotated clockwise as shown in FIG. 6b after engaging with lens-portion-mounting-hole 17 of body portion 13 from the side of back face 13a as shown in FIG. 6a.

Then slope 42 of back-face-side projection 21 rubs back face 13a of body portion 13 and body portion 13 is pinch-held by front-face-side projection 20 and back-face-side projection 21 like a wedge. This causes lens portion 6 to be fixed to body portion 13 by friction resistance. Therefore, rotation-stopping projection 26 as employed in the previous described embodiment may be omitted in this modification, or used together.

It is noted that only the lower face of front-face-side projection 20 of lens portion 6 may be a slope 41 if lens portion 6 is mounted on body portion 13 from the side of back face 13a of body portion 13.

In addition, only the upper face of back-face-side projection 21 of lens portion 6 may be a slope 42 if lens portion 6 is mounted on body portion 13 from the side of front face 13b of body portion 13.

Instead of slopes 41 and 42 of front-face-side projection 20 and back-face-side projection 21 of lens portion 6, body portion 13 has slopes rubbed by front-face-side projection 20 and back-face-side projection 21. This also allows lens portion 6 to be fixed to body portion 13 by friction resistance.

Further, lens portion 6 may be fixed to body portion 13 by friction resistance and relative rotation may be stopped (rotation stopping) by making diameter of periphery-side circular portion 23 of lens portion 6 got greater from downstream to upstream of rotation direction and by having periphery-side circular portion 23 rub lens-portion-mounting-hole 17.

<Third Modification of Light Flux Control Member>

Figure 12:
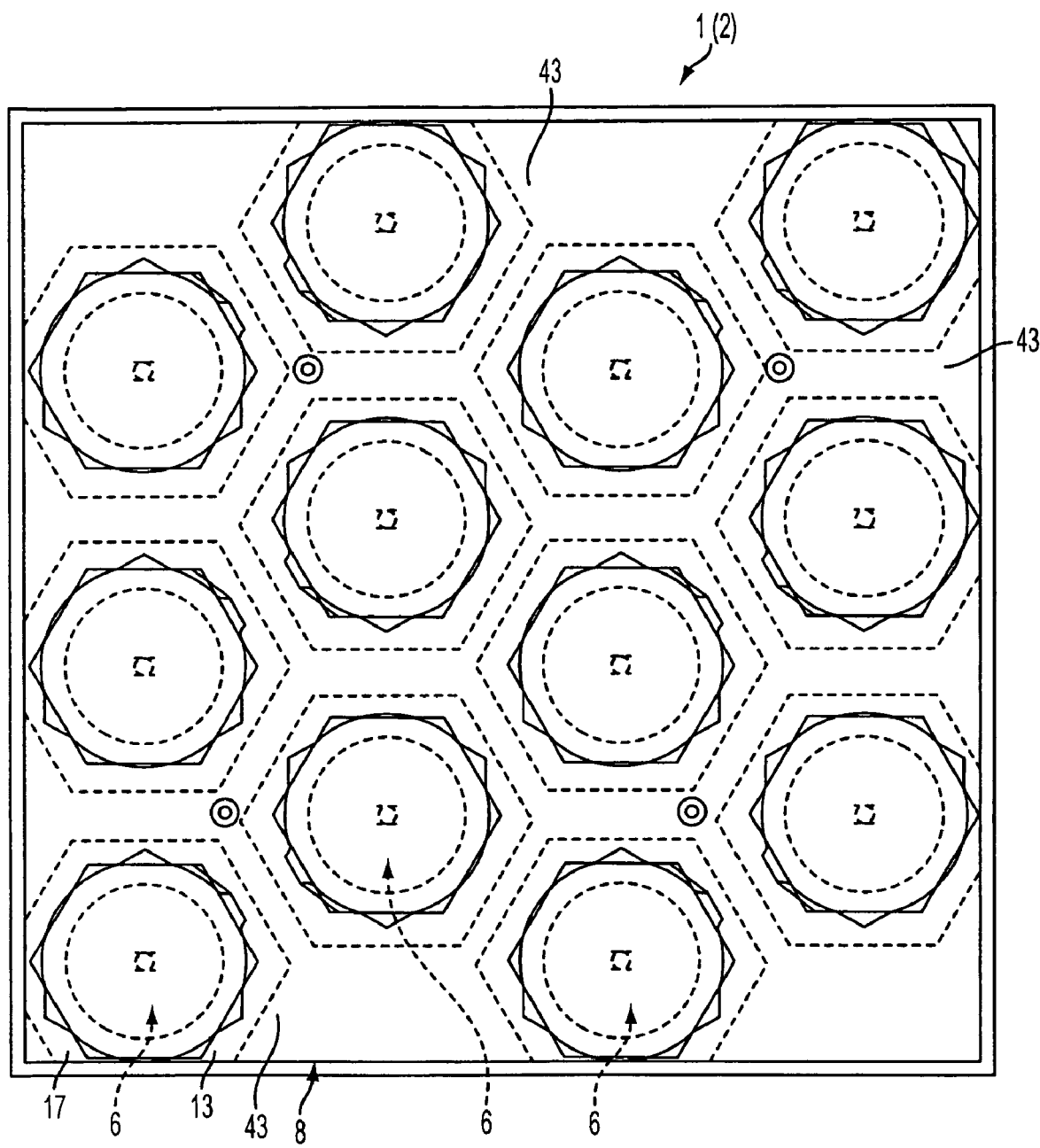
FIG. 12 is a plan view of an illumination device and an illumination unit including the same for illustrating a third modification of light flux control member, with a member-to-be-illuminated and a light diffusion member being omitted.

FIG. 12 shows light flux control member 8 (in particular, lens portion 6) employed in a third modification. According to the third modification, body portion 13 is provided with light diffusion area 43 (shown by dotted mark) between lens-portion-mounting-holes 17, 17. Light diffusion quantity is the largest at a center of intermediate of lens portions 6 and falls with approaching lens portion 6. An area without light diffusion processing is formed around lens portion 6 (lens-portion-mounting-hole 17).

According to illumination device 2 and illumination unit 1 employing body portion 13 in accordance with this modification light diffusion area 43 of body portion 13 diffuses light between lens portions 6. Therefore, illumination more uniformalized two-dimensionally as compared with a case where body portion 13 to which no light diffusion processing is applied is employed.

<Forth Modification of Light Flux Control Member>

Figure 13A:
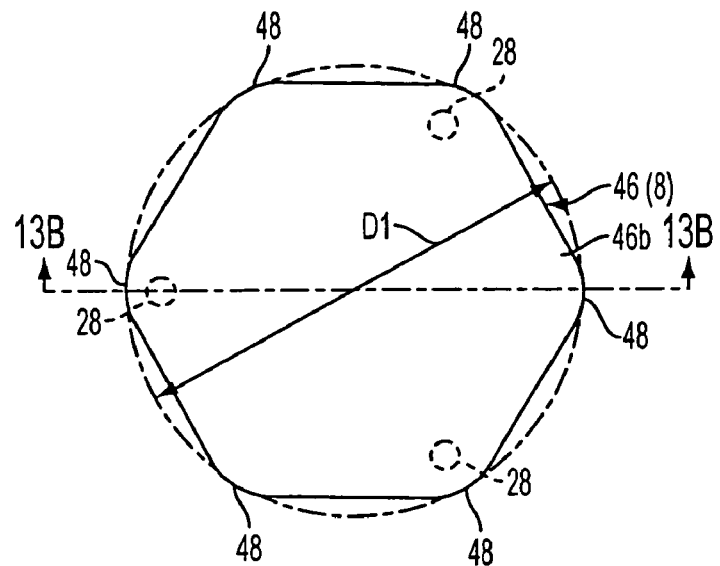
FIG. 13a is a plan view of a lens portion employed in a forth modification of light flux control member.
Figure 13B:
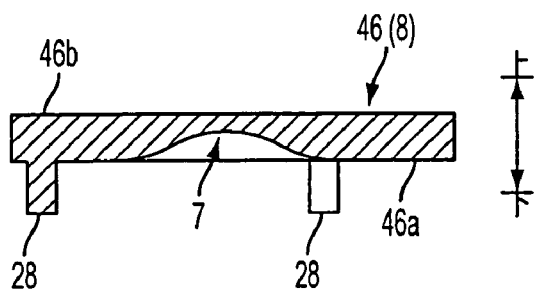
Figure 13C:
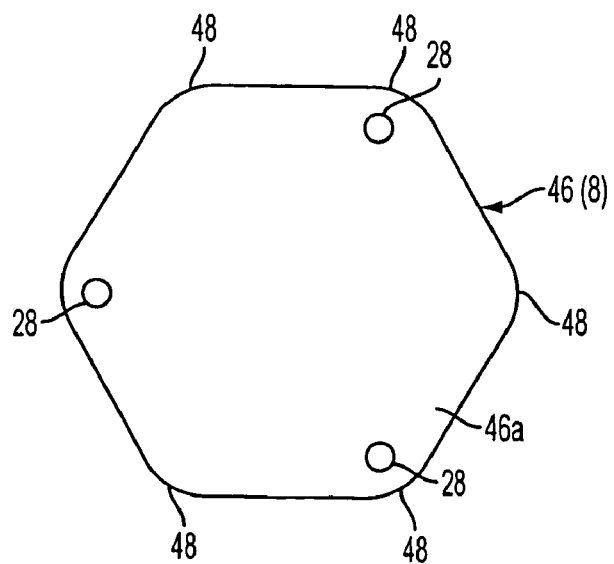
FIG. 13c is a back side plan view of the same lens portion.
Figure 14A:
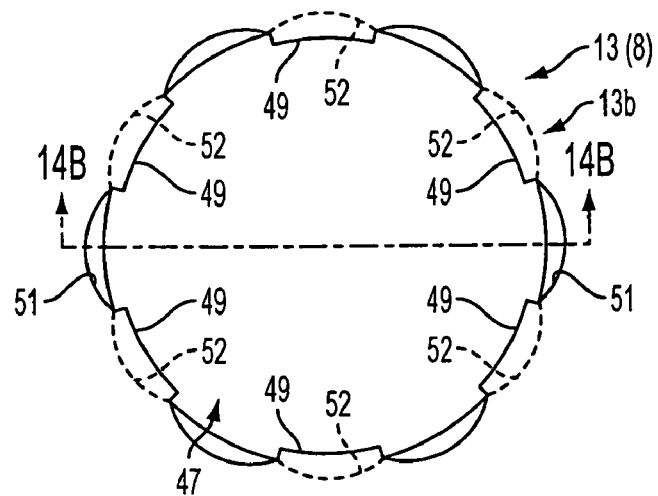
FIG. 14a is a plan view of a light flux control member of the forth modification, illustrating a mounting a lens-portion-mounting-hole of a mounting portion (body portion)
Figure 14B:
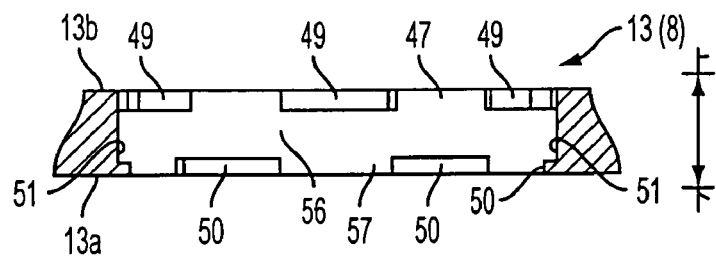
Figure 14C:
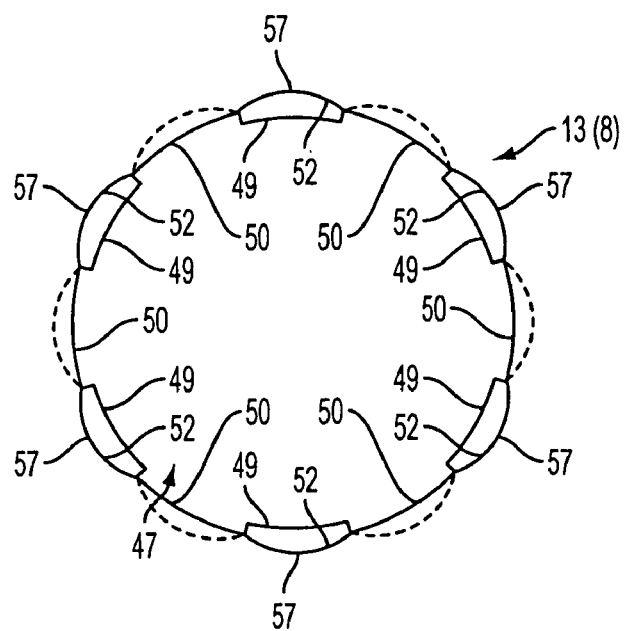
FIG. 14c is a back side plan view of the mounting a lens-portion-mounting-hole of the mounting portion (body portion)

Light flux control member 8 of this modification employs lens portions 46 as shown in FIGS. 13a to 13c, which are mounted to lens-portion-mounting-holes 47 as shown in FIGS. 14a to 14c from the side of back face 13a of body portion 13.

Lens portion 46 of this modification plate-like member of a hexagonal planar shape as shown in FIGS. 13a to 13c. Recess 7 is formed on the back face side and supporting pins 28 are formed on the back face side of three vertexes 48 in six vertexes 48 at angular intervals of 20°. Tops intruding sideway of vertexes 48 are rounded like an arc.

On body portion 13, six front-face-side projections 49 are formed along a periphery direction of an upper edge (front face 13b's side end portion) of lens-portion-mounting-hole 47 at a constant interval as shown in FIGS. 14a to 14c.

Body portion 13 has back-face-side projections 50 formed along a periphery direction of a lower edge (back face 13a's side end portion) of lens-portion-mounting-hole 47 at locations corresponding to between front-face-side projections 49.

Gap 56 receiving rotatably vertexes 48 of lens portion 46 is formed between front-face-side projections 49 and back-face-side projection 50 of body portion 13.

Projection-receiving hole 57 is formed as to allow vertexes 48 of lens portion 46 to pass through in front-back directions (upper and lower directions in FIG. 15c) at locations between back-face-side projections 50 adjacent to each other.

In this body portion 13, inner diameter D2 of inner-side circular portion 51 of lens-portion-mounting-hole 47 is slightly larger than outer diameter D1 of lens portion 46.

Figure 15A:
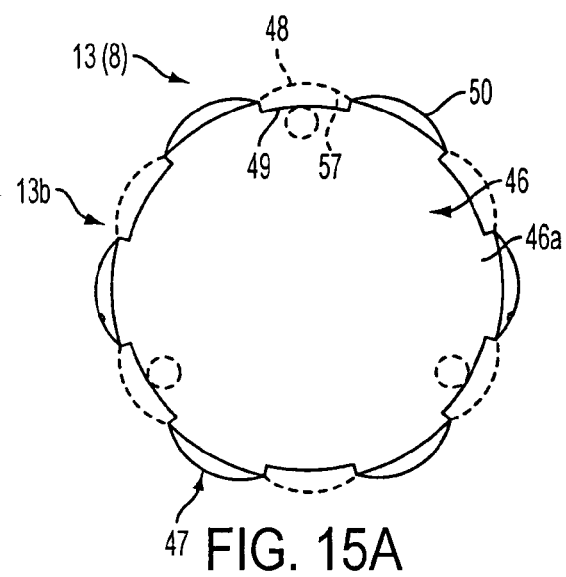
FIG. 15a is a plan view for illustrating a state that the lens portion has engaged with the lens-portion-mounting-hole of the mounting portion (body portion) of the light flux control member of the forth modification.
Figure 15C:
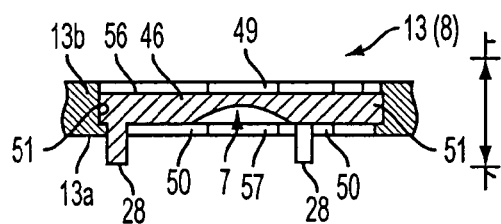
FIG. 15c is a cross section view of along line D-D in FIG. 15b.

This allows lens portion 46 to be rotated. Back-face-side projection 50 is cut up obliquely from inner-side circular portion 51 and projection-receiving recess 52 for receiving vertexes of lens portion 46 between back-face-side projection 50 adjacent to each other is formed as to generally correspond to front-face-side projection 49. Lens portion 46 is mounted on body portion 13 as follows, First, as shown in FIG. 15a, vertex 48 of lens portion 46 is aligned with projection-receiving hole 57 of lens-portion-mounting-hole 47, and lens portion 46 is engaged with lens-portion-mounting-hole 47 from the side of back face 13a of body portion 13.

Figure 15B:
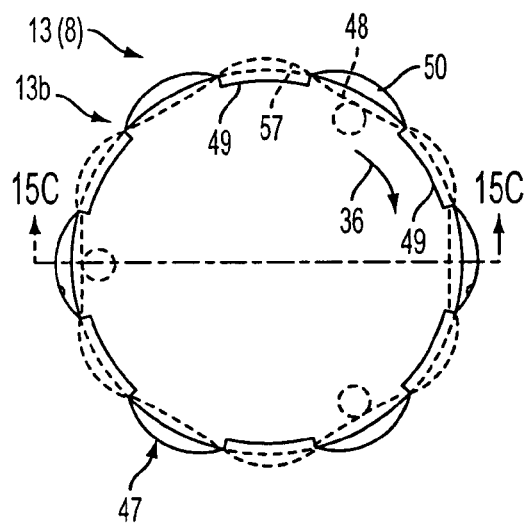
Figure 15D:
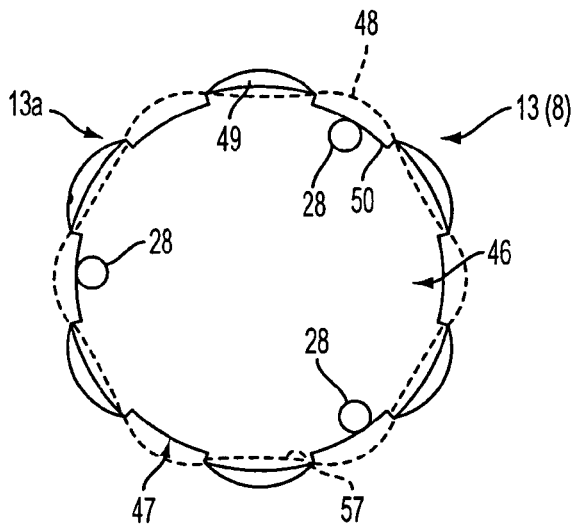

Then, after the front have 13b side of each vertex 48 of lens portion 46 is abutted to a lower face of front-face-side projection 49 (See FIGS. 13a to 13c and 14a to 14c), lens portion 46 is rotated by 30° clockwise (in a direction shown by arrow 36) as shown in FIG. 15b.

Vertex 48 of lens portion 46 is shifted from projection-receiving hole 57 in a periphery direction and is held by back-face-side projection 50, outer periphery portions between vertexes adjacent to each other of lens portion 46 are pressed by front-face-side projection 49.

That is, lens portion 46 is accommodated in gap 56 between front-face-side projection 49 and back-face-side projection 50 of lens-portion-mounting-hole 47, being held by front-face-side projection 49 and back-face-side projection 50 in a front-back direction (upper-lower direction). Although, in this modification, lens portion 46 is engaged from the side of back face 13a of body portion 13, this is merely an example. Instead, lens portion 46 may be engaged from the side of front face 13b of body portion 13. If so done, vertex 48 of lens portion 46 is engaged into gap 56 from projection-receiving hole formed between front-face-side projections 49 adjacent to each other into gap 56.

<Other Modifications of Light Flux Control Member>

Lens portions 6, 46 may have shapes other that hexagon-like shape. For example, triangular, rectangular, pentagon-like, septangle-like or octagon-like shapes may be employed. Alternatively, lens portions 6, 46 may have a generally circular planar shape and be provided with front-face-side projections and back-face-side projections projecting locally and radially outward at locations corresponding to vertexes 24, 48 of polygon such as hexagon. In this case, front-face-side projections and back-face-side projections of lens portion 6, 46 are preferably arranged alternately along a peripheral direction of lens portion 6, 46. Lens-portion-mounting-holes 17, 47 of body portion 13 are formed according to shapes of lens portions 6, 46.

<Light Diffusion Member>

FIGS. 16*a* to 16*f* are enlarged side views of light diffusion members 4 of first to sixth examples, respectively. FIG. 16*g* is a partially enlarged side view of illumination unit 1. Each light diffusion member 6 is a sheet-like or plate-like member made of light well-permeable resin such as PMMA (polymethyl methacrylate) or PC (polycarbonate). A planar shape and area size of each light diffusion member 4 are generally equal to those of member-to-be-illuminated 3 (such as LCD panel or advertising panel).

First Example

Figure 16A:
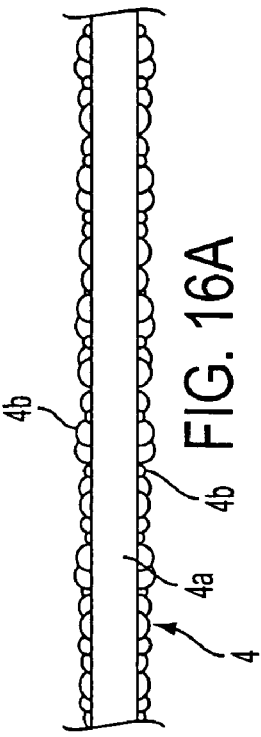
FIG. 16a is an enlarged side view of a light diffusion member of a first example.

As shown in FIG. 16*a*, employed is a sheet-like base material 4*a* both faces of which processing for giving light diffusion ability, such as emboss-processing or bead-coating, is applied, thereby both faces of light diffusion member 4 made provided with fine uneven configurations 4*b*, 4*b*. Such fine uneven configurations 4*b*, 4*b* cause light diffusion.

Second Example

Figure 16B:
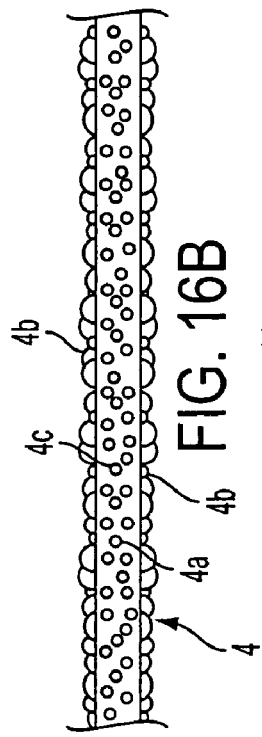
FIG. 16b is an enlarged side view of a light diffusion member of a second example.

As shown in FIG. 16*b*, employed is a sheet-like base material 4*a* within which light diffusive material 4*c* is dispersed, and processing for giving light diffusion ability, such as emboss-processing or bead-coating, is applied to both faces of base material 4*a* to form fine uneven configurations 4*b*, 4*b* thereon. Such fine uneven configurations 4*b*, 4*b* cause light diffusion.

Third Example

Figure 16C:
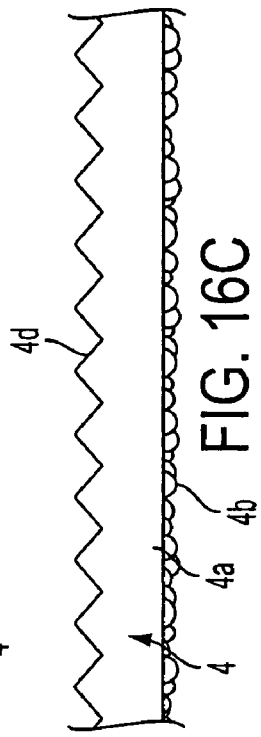
FIG. 16c is an enlarged side view of a light diffusion member of a third example.

As shown in FIG. 16*c*, employed is sheet-like base material 4*a* has a face, directed to light flux control member 8, to which processing for giving light diffusion ability, such as emboss-processing or bead-coating is applied to form a fine uneven configuration 4*b*. The other face of light diffusion member 4 is provided with a great number of successively arranged prismatic projections 4*d* extending along a direction perpendicular to the paper surface. Prismatic projections 4*d* are shaped like triangles (typically, isosceles triangles). Prismatic projections 4*d* has a function of redirecting light so that light travelling directions come near to a frontal direction while fine uneven configurations 4*b* cause light diffusion.

Fourth Example

Figure 16D:
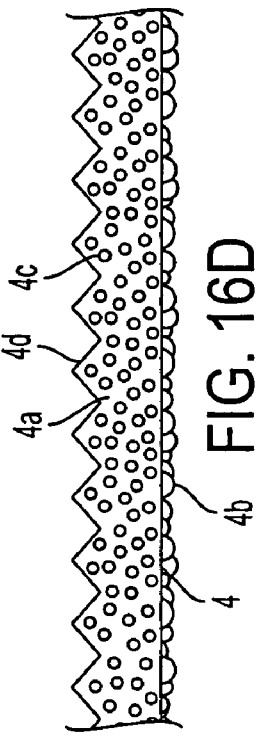
FIG. 16d is an enlarged side view of a light diffusion member of a forth example.

As shown in FIG. 16*d*, light diffusion member 4 is the same as one shown in FIG. 16*c* except that light diffusive material 6*c* is dispersed within base material 4*a*. In the same manner as the case of FIG. 16*c*, processing such as emboss-processing or bead-coating is applied to one face directed to light flux control member 4 to form a fine uneven configuration 4*b*. The other face of light diffusion member 4 is provided with a great number of successively arranged prismatic projections 4*d*.

Fifth Example

Figures 16E, 16F:
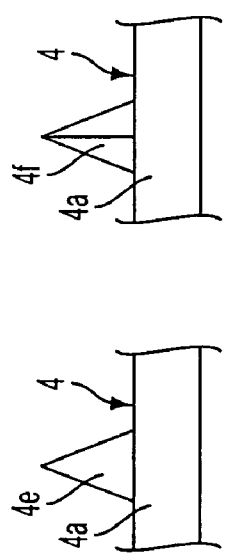
FIG. 16e is an enlarged side view of a light diffusion member of a fifth example.
FIG. 16f is an enlarged side view of a light diffusion member of a sixth example.
Figure 16G:
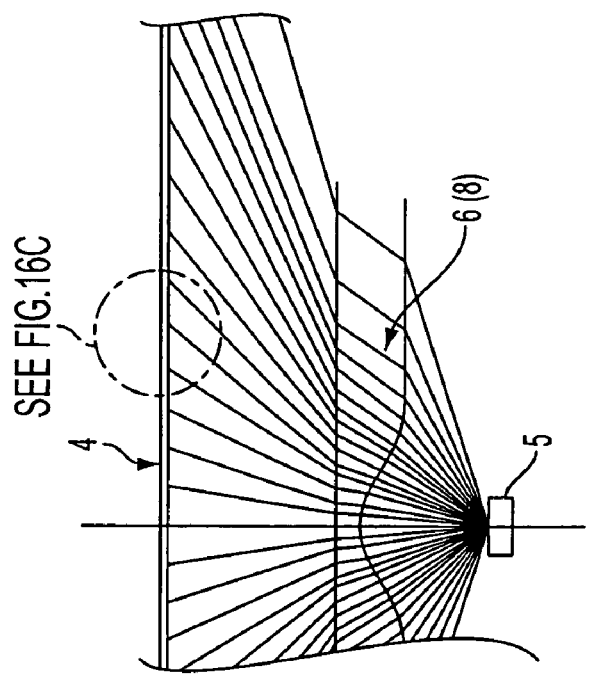
FIG. 16g is a partially enlarged side view of an illumination unit.

As shown in FIG. 16*e*, light diffusion member 4 employs sheet-like base material 4*a* on an emission side face of which a plurality of circular-cone-like projections 4*e* are formed to cause light transmitted through base material 4*a* to be diffused.

Sixth Example

As shown in FIG. 16*f*, light diffusion member 4 employs sheet-like base material 4*a* on an emission side face of which pyramid-like (such as triangle-pyramid-like, quadrangle-pyramid-like or hexangle-pyramid-like) projections 4*f* are formed. Projections 4*f* cause light transmitted through base material 4*a* to be diffused.

Every example of light diffusion member 4 is arrange outside of a light flux control member 8 (in light paths of emission), as shown in FIG. 16*g*, transmitting and diffusing light inputted therein and supplying uniformalized light to member-to-be-illuminated 3.

It is noted that light diffusion member 4 may be mounted on an inner face, directed to light flux control member 8, of member-to-be-illuminated 3, or alternatively, may be interposed between light flux control member 8 and member-to-be-illuminated 3, with being separated from member-to-be-illuminated 3.

<Modification of Illumination Device and Illumination Unit>

(First Modification)

Figure 17:
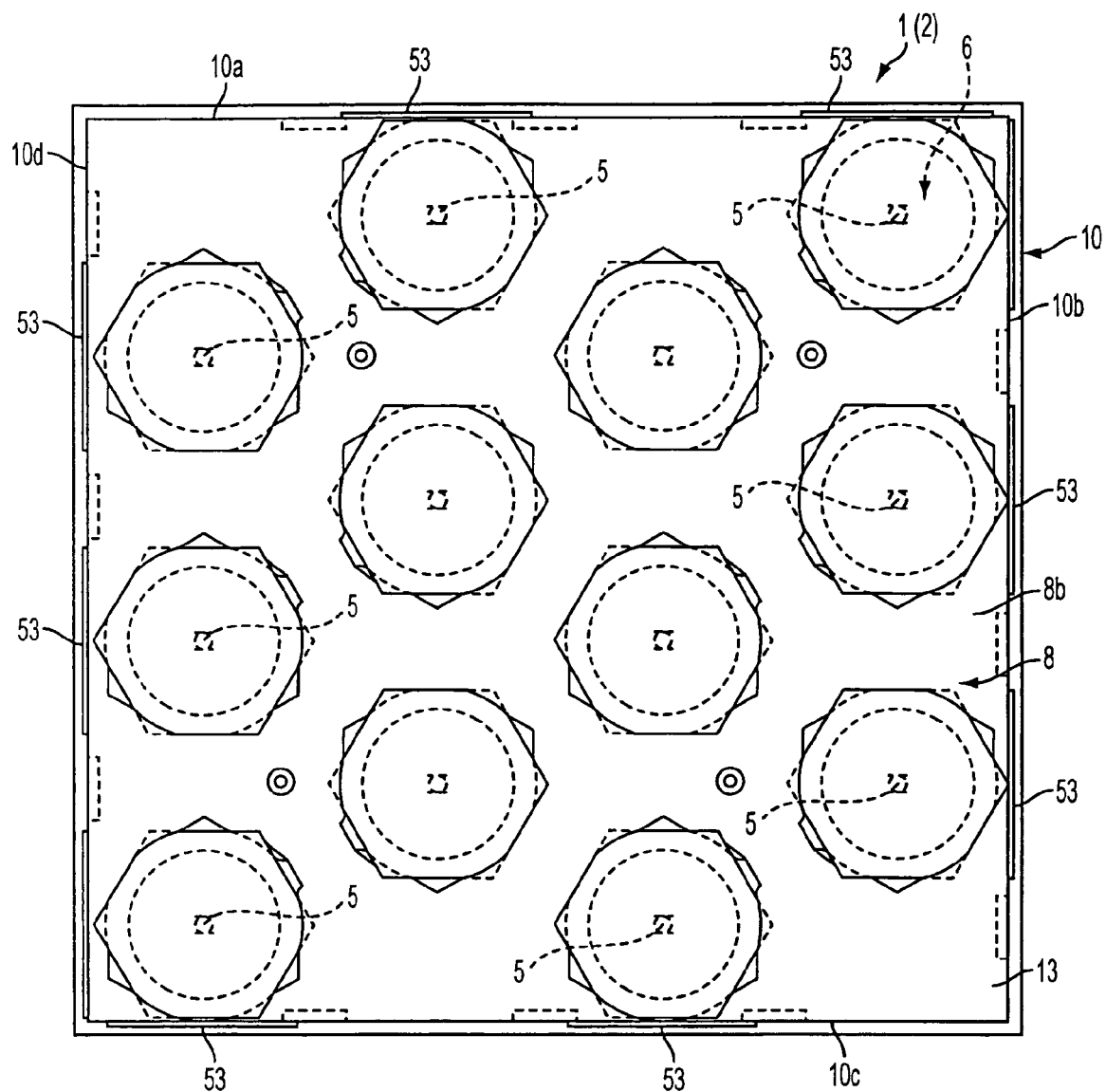
FIG. 17 is a plan view of an illumination device and an illumination unit of a first modification, with a member-to-be-illuminated and a light diffusion member being omitted.

FIG. 17 is a plan view of illumination device 2 and illumination unit 1 of a first modification of the embodiment. If LEDs 5 are close to inner side faces 10*a* to 10*d* of case 10 accommodating light flux control member 8, light from LEDs 5 tends to, after being reflected by inner side faces 10*a* to 10*d* of the case, be emitted from an emission face 6*b* (front face 8*b* of light flux control member 8) in the vicinity of inner side faces 10*a* to 10*d*, as shown in FIG. 17. As a result, intensity distribution of emission from front face 8*b* has brightness unevenness. In order to avoid this, if LEDs 5 are close to inner side faces 10*a* to 10*d*, light-shielding-processed portions (hatched areas in the illustration) 53 are formed are formed partially, in the vicinity of LEDs 5, on inner side faces 10*a* to 10*d*. Light-shielding-processed portions (hatched areas in the illustration) reduce light reflectivity of inner side faces 10*a* to 10*d* by, for example, application of well-light-absorptive black ink.

It is noted that width of light-shielding-processed portion 53 is generally equal to the maximum diameter of recess 7 in FIG. 17. In addition, Light-shielding-processed portions 53 cover a range corresponding to generally full height of inner side faces 10*a* to 10*d* (See FIG. 2). Thus this modification employs light-shielding-processed portions 53 covering generally full height of inner side faces 10*a* to 10*d*. However, this gives merely an example. Covering may corresponds to a part of full height of inner side faces 10*a* to 10*d*, as required.

Instead of formation of light-shielding-processed portions, voltage applied to LEDs 5 located close to inner side faces 10*a* to 10*d* may be reduced in this modification.

Needless to say, reduction of voltage cases LEDs 5 to which reduced voltage is applied provide reduced light quantity. As a result, light reflected by inner side faces 10*a* to 10*d* is avoided from reducing evenness of brightness of emission from front face (emission face) 8*b* of light flux control member 8. Further, light-shielding-processed portions may be formed on side faces, opposite to inner side faces 10*a* to 10*d*, of body portion 13 of light flux control member 8.

Further alternatively, instead of light-shielding-processed portions formed on case 10 or body portion 13 of light flux control member 8, a light diffusion member having light-shielding-processed portions utilizing, for example, printing may be employed. A plurality of processing in the above processings may be employed in combination. Light-shielding-processed portions may be formed on a reflection sheet disposed on bottom plate 11 as required.

(Second Modification)

Figure 18:
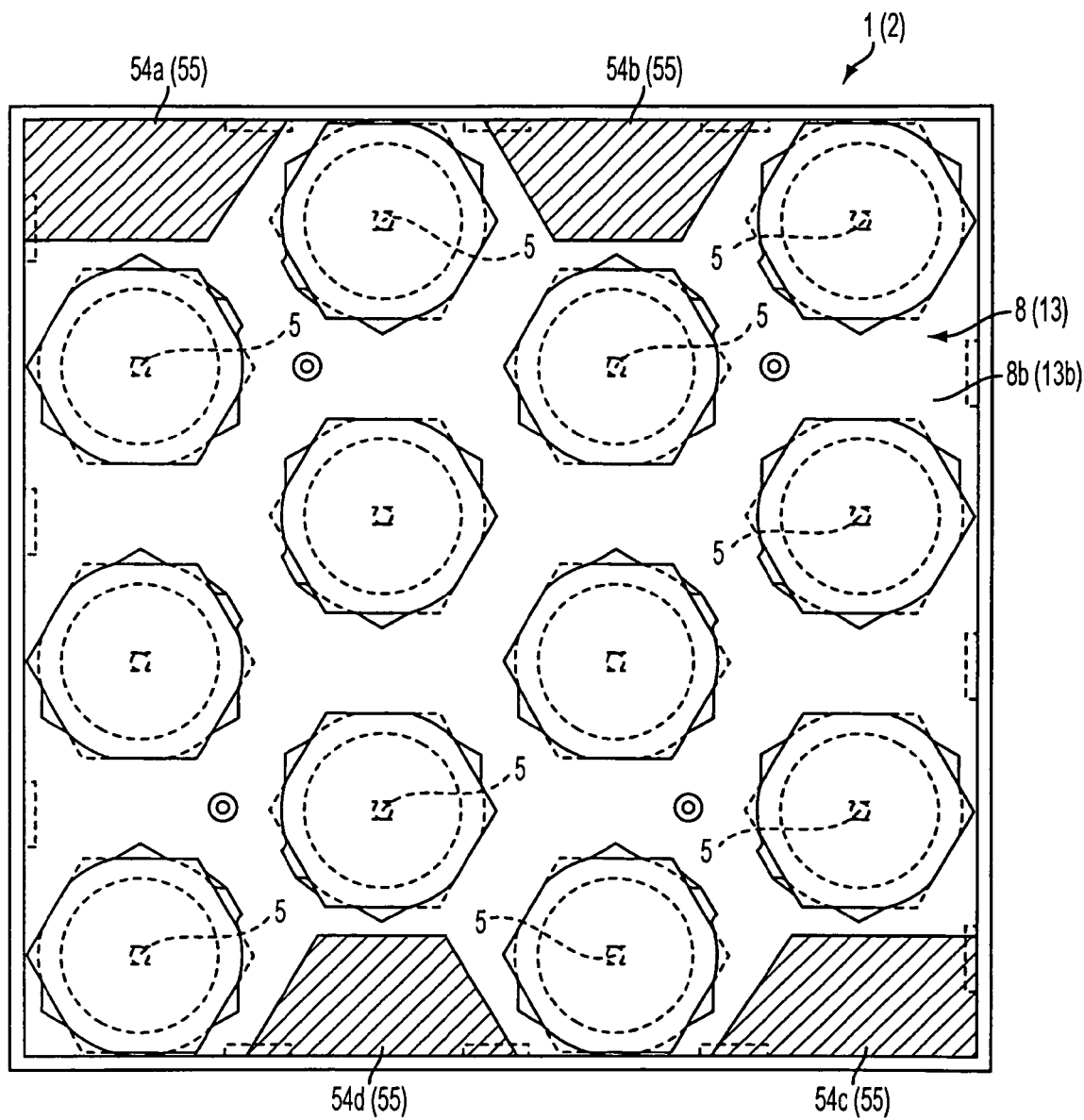
FIG. 18 is a plan view of an illumination device and an illumination unit of a second modification, with a member-to-be-illuminated and a light diffusion member being omitted.

FIG. 18 shows illumination device 2 and illumination unit 1 employing the same, to which the present invention can be applied, in accordance with a second modification. According to this modification, no LED 5 is disposed in areas shown by hatched areas 54*a* to 54*d* as shown in FIG. 18. Accordingly, emission intensity of front face (emission face) 8*b* of light flux control member 8 falls in the vicinity of hatched areas 54*a*.

In order to avoid this, front face 8*b* (i.e. front face 8*b* of body portion 13) is provided with irregular-reflection areas 55 formed by applying irregular-reflection-processing to hatched portions 54*a* to 54*d* of body portion 13. Light coming to irregular-reflection areas from LEDs 5 close thereto is reflected irregularly, promoting light emitting from hatched portions 54*a* to 54*d* which would be subject to reduction of emission quantity. As a result, brightness of emission from front face (emission face) 8*b* of light flux control member 8 is uniformalized.

It is noted that irregular-reflection-processing is processing, for example, for giving irregular-reflection ability by surface-roughening, applying an irregularly-reflective film or irregularly-reflective paint. Irregular-reflection areas 55 are preferably formed of front, back and side faces of light flux control member 8. In general, formation at one or more parts of front, back and side faces of light flux control member 8 will be enough.

<Quantity of Light (Light Intensity) of Emission from Light Diffusion Member>

Figure 19:
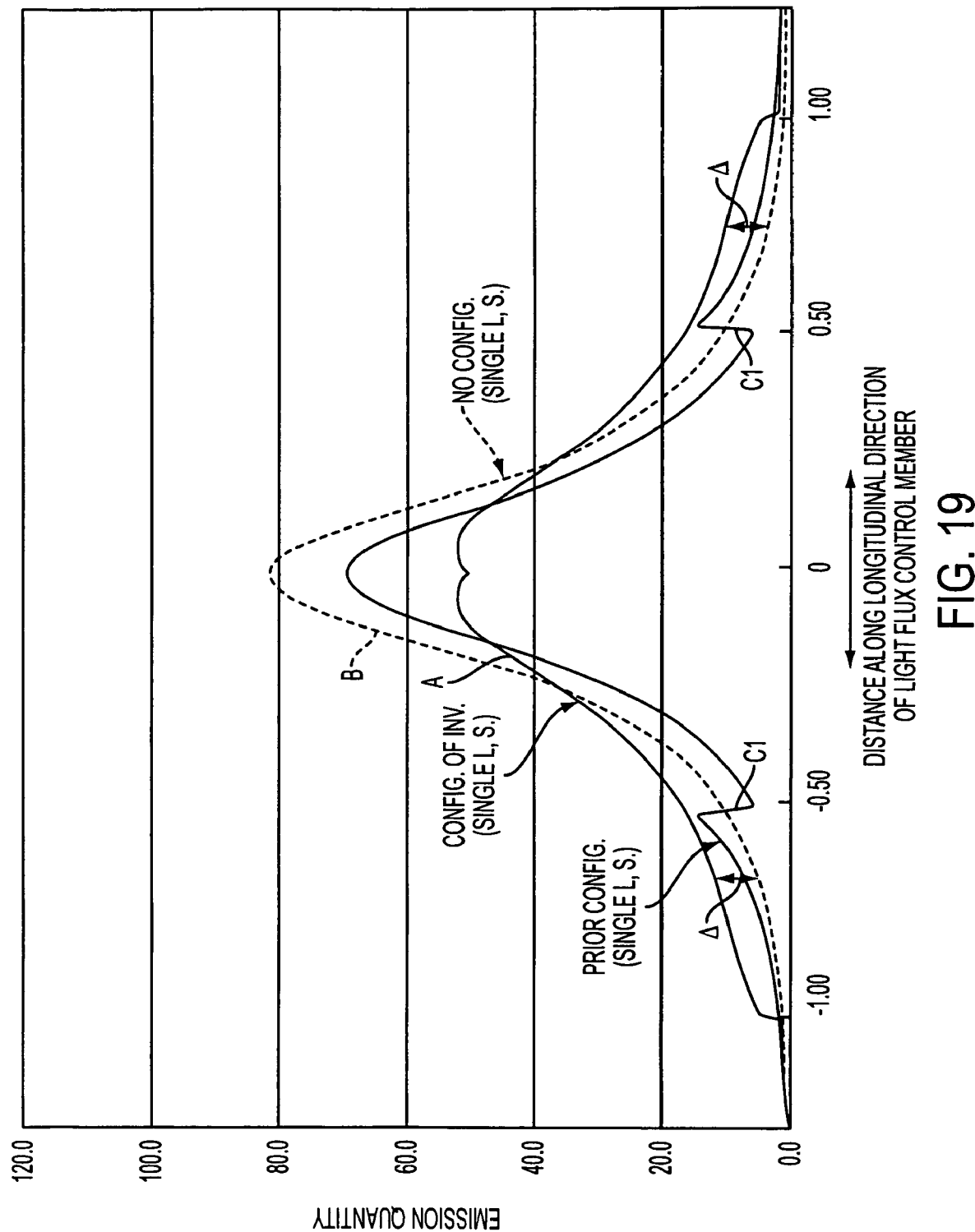
FIG. 19 is a graph illustrating an emission quantity (emission intensity) of the light supplied to a light diffusion member of an illumination unit (single light source; single LED) to which the present invention is applied.

FIG. 19 is a graph illustrating a distribution of emission quantity (emission intensity distribution) of the light supplied to member-to-be-illuminated 3 in illumination unit 1.

In FIG. 19, curve A (CONFIG. OF INV. (SINGLE L.S.)) shows a distribution of emission intensity in a case where a single LED 5 (point light source) is disposed opposite to back face 8*a* of light flux control member 8 and recess 7 is formed on back face 8*a* (back face 6*a*, 46*a*) of light flux control member 8 (lens portion 6, 46).

On the other hand, curve B (NO CONFIG. (SINGLE L.S.)) shows a distribution of emission intensity in a case where a single LED 5 is disposed and no recess 7 is formed of light flux control member 8 (lens portion 6, 46).

Comparing curve A with curve B, curve A tells that an increased intensity is realized at positions very far from optical axis L as compared with that shown by curve B. Such an increased intensity is expressed by difference Δ between A and B.

Figure 20:
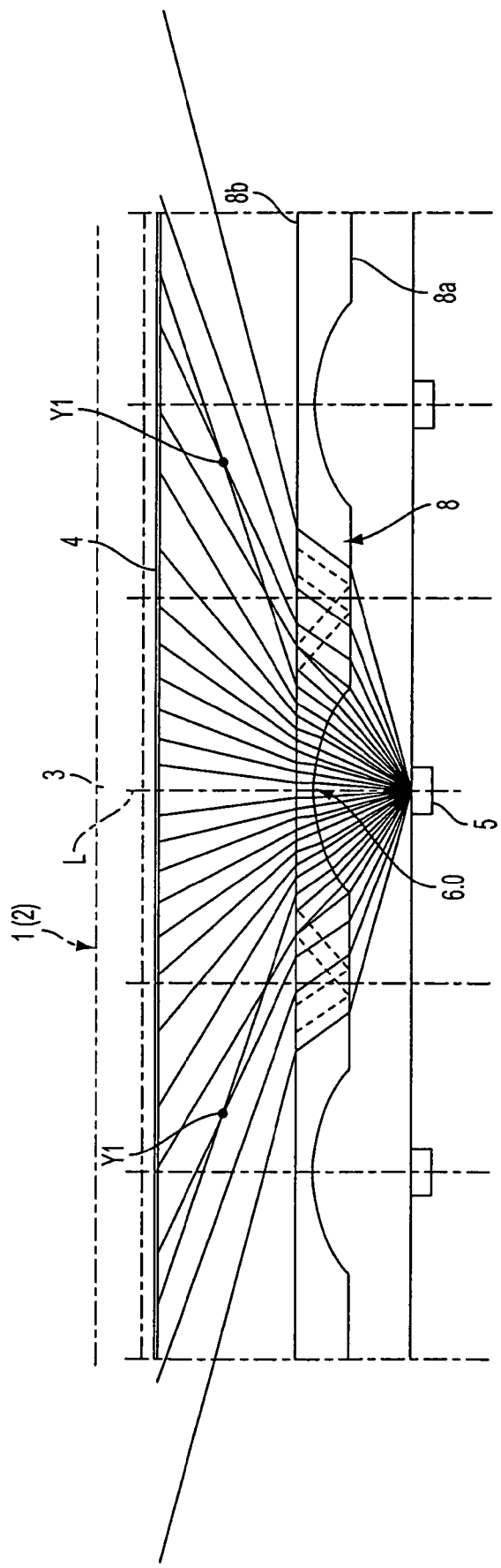
FIG. 20 is a diagrammatic cross section view of an illumination unit (forth prior art) and a light flux control member employed therein provided with a recess having a conventional configuration under a condition of single light source.
Figure 21:
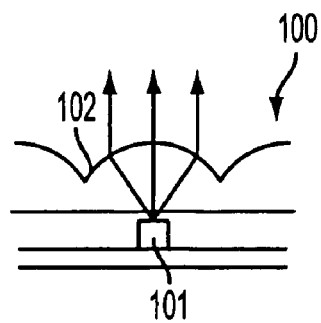
FIG. 21 is a diagrammatic structure view of a first prior art.
Figure 22:
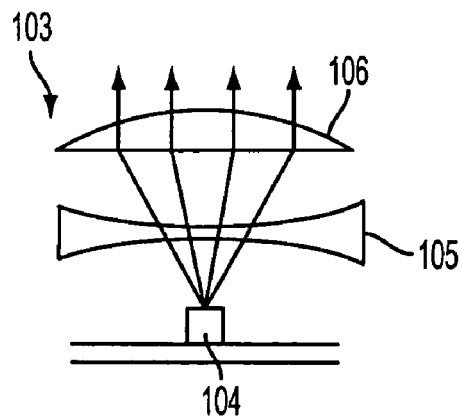
FIG. 22 is a diagrammatic structure view of a second prior art.
Figure 23:
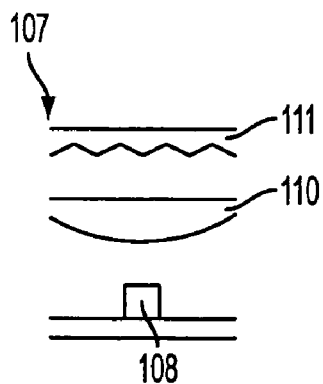
FIG. 23 is a diagrammatic structure view of a third prior art.

FIG. 20 shows illumination device 2 and illumination unit 1 employing light flux control member 8 provided with a recess having a conventional hemispheric recess 60 (PRIOR CONFIG. (SINGLE L.S.)).

A distribution of emission intensity of illumination unit 1 shown in FIG. 20 is depicted by curve C in FIG. 19. Curve C tells that a sharp rising of emission intensity occurs at a region C1.

It is supposed that such a sharp intensity rising is caused by that light flux control member 8 provides emission light beams of a plurality of directions which are mutually intersected and a sharp increase in emission quantity occurs as to correspond to such mutually intersected locations, as shown by Y1 in FIG. 20.

In the case of illumination unit 1 employing light flux control member 8 shown in FIG. 20, θ3 increases with increase of θ1 in θ1-θ3 relation for prior configuration illustrated in FIG. 8. In addition, seeing relation between θ5 and θ1, value of (θ5/θ1) increases with increase of θ1 although (θ5/θ1)>1 in the same manner as compared with the present invention. In other words, there is a great difference as compared with configuration employed in the present invention according to which value of (θ5/θ1) decreases gradually with increase of θ1.

As a result, there is a sharply changing at connection with planar face of the side of back face 8*a* of light flux control member 8, making difficult to output a uniformly expanded emission fluxes from front face (emission face) 8*b* of light flux control member 8 (See FIG. 20). Besides, some light traveled within light flux control member 8 is inner-reflected by front face (emission face) 8*b* without being outputted from front face (emission face) 8*b*, reducing emission efficiency.

In contrast with such conventional illumination unit 1 (See FIG. 20), illumination unit 1, which employs light flux control member 8 (lens portion 6, 46) as shown in FIG. 3 in accordance with the embodiment, has recess 7 satisfying foresaid Configuration Condition. Accordingly, light from LED 5 can be emitted after being expanded efficiently, uniformly and smoothly through travelling in light flux control member 4 (See line A in FIG. 19). It is noted that light flux control member 8 shown in FIG. 3, made of the same resin material as compared with lens portion 6, 46 employed in the present invention.

EFFECTS OF THE EMBODIMENT

According to the embodiment described above, lens portions 6, 46 which are required to have highly accurate configuration are allow to be produced separately by applying injection-molding because lens portions 6, 46 are mounted on body portion 13 detachably. Further to this, lens portions 6, 46 allow common use in illumination devices 2 and illumination unit 1 having different layouts of LEDs 5.

Therefore, the above-described embodiment enables only one kind of mold for injection-molding to be used for producing lens portions 6, 46 so far as lens portions 6, 46 have one common configuration, even if different layouts of LEDs 5 are employed, with the result that a reduced cost for molds and manufacturing of illumination devices 2 (illumination unit 1) can be aimed.

In addition, light fluxes from LEDs 5 can be expanded broadly and effectively by recesses 7 of lens portions 6, 46 of a light flux control member 8, enabling light flux control member 8 to have front face (emission face) 8*b* providing an illumination light directed toward a broad range.

Therefore, under arrangement of a plurality of LEDs 5 as light sources, rays from individual LEDs 5 tend to be mixed easily, and accordingly, if emission colors of individual LEDs 5 are different from each other, emission via light flux control member 8 can avoid from showing a conspicuous emission color unevenness due to emission color unevenness of individual LEDs 5. Besides, emission brightness is uniformalized and illumination quality is improved.

Still further saying, layout of lens portions 46 (recesses 7) can meet that of LEDs 5 because lens portions 6, 46 are mounted to body portion 13 detachably. This gives layout of LEDs 5 an increased flexibility.

<Other Modifications of Light Flux Control Member>

The above-described embodiment exemplarily shows light flux control member 8 has recesses 7 which are formed on the side of back face 6*a*, 46*a* of lens portions 6, 46. However, recesses 7 may be formed on the side of front face (emission face) 6*b*, 46*b* of lens portions 6, 46. Alternatively, recesses 7 may be formed on the sides of back face 6a, 46a and front face (emission face) 6b, 46b of lens portions 6, 46.

It is noted that the above-described embodiment shows a case in which an optical axis of light emitted from LED 5 accords the normal direction as shown in, for example, in FIG. 3. However, this does not limit the scope of the present invention.

The present invention can be applied to cases where the optical axis of light emitted from LED 5 is slightly different from the normal direction due to unevenness in quality of LEDs 5 or assembling errors of components including LEDs 5, allowing to provide generally the same effects as those of the embodiments described above.

In addition, LEDs 5 may emit light other than monochromatic light. Colored-light-emitting LEDs 5 may be employed.

Although the above-described embodiment shows a case in which lens portions 6, 46 have supporting pins 28 back side configuration of which are circular, this gives merely an exemplary case. Back side configuration of supporting pins 28 may be semi-circular or polygon-like.

What is claimed is:

1. An illumination device emitting light from a point-like light source via a light flux control member emitting light from said point-like light source, comprising:
    a plurality of point-like light sources, a plurality of lens portions and lens-portion-mounting-holes,
    wherein each of said lens portions and each of said lens-portion-mounting-holes are arranged as to correspond to each of said point-like light sources,
    said light flux control member has a lens portion which is located as to correspond to said point-like light source and provided with a back face directed to said point-like light source and a front face opposite to the back face, and a body portion mounting said lens portion detachably,
    said body portion being provided with a lens-portion-mounting-hole receiving and engaging with said lens portion, and
    said lens portion being fixed to said body portion by rotation after said lens-portion-mounting-hole has engaged with said lens-portion.

2. An illumination unit comprising;
    an illumination device; and
    a light diffusion member diffusing light from said illumination device, wherein said illumination device is according to claim 1.

3. An illumination device emitting light from a point-like light source via a light flux control member emitting light from said point-like light source,
    wherein said light flux control member has a lens portion which is located as to correspond to said point-like light source and provided with a back face directed to said point-like light source and a front face opposite to the back face, and a body portion mounting said lens portion detachably,
    said body portion being provided with a lens-portion-mounting-hole receiving and engaging with said lens portion,
    said lens portion being fixed to said body portion by rotation after said lens-portion-mounting-hole has engaged with said lens-portion,
    each of said tens portions includes a periphery-side circular portion, a back-face-side projection, a front-face-side projection,
    said back-face-side projection being formed on a back face side as to project radially outward beyond said periphery-side circular portion,
    said front-face-side projection being formed on a front face side as to project radially outward beyond said periphery-side circular portion and being differently located as compared with said back-face-side projection to a direction of said rotation,
    said lens-portion-mounting-hole being formed so as to be fit into said periphery-side circular portion of said lens portion in a relatively rotatable manner,
    said body portion having at least one of a first projection-receiving-hole enabling said front-face-side projection to move from a side of said back face to a said of said front face and a second projection-receiving-hole enabling said back-face-side projection to move from the side of said front face to a side of said back face,
    said body portion being sandwiched by said front-face-side projection and said back-face-side projection of said lens portion from sides of said front face and said back face at least at a periphery part of said lens-portion-mounting-hole, and
    when said lens portion is mounted to said body portion from a back side of said body portion, said lens portion is rotated with respect to said body portion so that said front-face-side projection is shifted with respect to said first projection-receiving-hole in a rotation direction to pinch-support said periphery-side circular portion of said lens-portion-mounting-hole of said body portion between said front-face-side projection and said back-face-side projection of said lens portion from front-and-back-sides, after said front-face-side projection of said lens portion and said first projection-receiving-hole of said body portion are aligned to each other and said periphery-side circular portion and said lens-portion-mounting-hole of said lens portion are aligned to each other, and further said lens portion has engaged with said body portion so that said front-face-side projection extrudes to a side of said front face of said body portion,
    alternatively when said lens portion is mounted to said body portion from a front side of said body portion, said lens portion is rotated with respect to said body portion so that said back-face-side projection is shifted with respect to said second projection-receiving-hole in a rotation direction to pinch-support said periphery-side circular portion of said lens-portion-mounting-hole of said body portion between said front-face-side projection and said back-face-side projection of said lens portion from front-and-back-sides, after said back-face-side projection of said lens portion and said second projection-receiving-hole of said body portion are aligned to each other and said periphery-side circular portion and said lens-portion-mounting-hole of said lens portion are aligned to each other, and further said lens portion has engaged with said body portion so that said back-face-side projection extrudes to a side of said back face of said body portion.

4. An illumination unit comprising;
    an illumination device; and
    a light diffusion member diffusing light from said illumination device, wherein said illumination device is according to claim 3.

5. An illumination device according to claim 3, wherein at least one of a surface, which is opposite to said body portion, of said front-face-side projection and a surface, which is opposite to said body portion, of said back-face-side projection includes an inclined surface which provides friction force between said lens portion and said body portion so that said friction force increases gradually with rotation of said lens portion with respect to said body portion, and a periphery part of said lens-portion-mounting-hole is got in contact with said front-face-side projection and said back-face-side projection by rotation of said lens portion with respect to said body portion, thereby effecting regulation of relative rotation angle of between said lens portion and said body portion.

6. An illumination device according to claim 3, wherein at least one of said lens-portion-mounting-hole of said body portion and said lens portion is provided with a rotation-stopping-projection, and at least the other of said lens-portion-mounting-hole of said body portion and said lens portion is provided with a rotation-stopping-recess which engages with said rotation-stopping-projection and regulates a rotation angle of said lens portion with respect to said body portion.

7. An illumination device emitting light from a point-like light source via a light flux control member emitting light from a point-like light source via a light flux control member, wherein said light flux control member has a lens portion which is located as to correspond to said point-like light source and provided with a back face directed to said point-like light source and a front face opposite to the back face, and a body portion mounting said lens portion detachably, at least one of said front and back face of said lens portion being provided with a recess formed as to corresponding to said point-like light source, said recess being configured so that at least light emitted toward within a half-intensity-angular-range around a maximum-intensity-emission-direction from said point-like light source satisfies a condition that relation between $\theta 1$ which is an emitting angle of light emitted from said point-like light source with respect to a normal direction of an emission face of said lens portion and $\theta 5$ which is an emitting angle of light emitted from said lens portion with respect to the normal direction keeps $\theta 5/\theta 1 > 1$ except for light emitted toward within an angular-neighborhood of said normal direction in the light emitted from said point-like light source, and another condition that $\theta 5/\theta 1$ decreases gradually with increasing of $\theta 1$.

8. An illumination device according to claim 7, wherein said recess has a first light entering surface and second light entering surface which are connected to each other by a connection portion giving a point of inflection.

9. An illumination device emitting light from a point-like light source via a light flux control member emitting light from a point-like light source via a light flux control member, wherein said light flux control member has a lens portion which is located as to correspond to said point-like light source and provided a body portion mounting said lens portion detachably, said lens portion being provided with a top portion extruding sideways, said body portion being provided with a lens-portion-mounting-hole receiving said lens portion and allowing the lens portion to be rotated, a back-face-side projection projecting toward inside of said lens-portion-mounting-hole and located on a back face side of said body portion and a front-face-side projection projecting toward inside of said lens-portion-mounting-hole and located on a front face side of said body portion, and, a gap being formed between said back-face-side projection and said front-face-side projection as to receive said top portion of said lens portion and allow said top portion of said lens portion to be rotated, at least one of said back-face-side projection and said front-face-side projection being provided with a projection-receiving hole guiding said top portion of said lens portion to said gap, front and back sides of said top portion being supported from front and back directions by said front-face-side projection and said back-face-side projection through rotation of said lens portion with respect to said body portion for shifting said top portion of said lens portion with respect to said projection-receiving hole after said top portion of said lens portion has been guided into said gap by said projection-receiving hole.

10. An illumination device according to claim 9, wherein at least one of said lens-portion-mounting-hole of said body portion and said lens portion is provided with a rotation-stopping-projection, and at least the other of said lens-portion-mounting-hole of said body portion and said lens portion is provided with a rotation-stopping-recess which engages with said rotation-stopping-projection and regulates a rotation angle of said lens portion with respect to said body portion.

11. An illumination device according to claim 9, wherein at least one of said back-face-side projection, which projects toward inside of said lens-portion-mounting-hole of said body portion and is located at a back face side of said body portion, and said front-face-side projection, which projects toward inside of said lens-portion-mounting-hole of said body portion and is located at a front face side of said body portion, has a surface which is opposite to said lens portion and includes an inclined surface which provides friction force between said lens portion and said body portion so that said friction force increases gradually with rotation of said lens portion with respect to said body portion, and a periphery part of said lens-portion-mounting-hole is got in contact with said front-face-side projection and said back-face-side projection by rotation of said lens portion with respect to said body portion, thereby effecting regulation of relative rotation angle of between said lens portion and said body portion.

12. An illumination unit comprising;
an illumination device; and
a light diffusion member diffusing light from said illumination device, wherein said illumination device is as in any one of claims 7-8.

* * * * *

UNITED STATES PATENT AND TRADEMARK OFFICE
CERTIFICATE OF CORRECTION

PATENT NO. : 7,607,799 B2  Page 1 of 1
APPLICATION NO. : 11/582400
DATED : October 27, 2009
INVENTOR(S) : Shingo Ohkawa It is certified that error appears in the above-identified patent and that said Letters Patent is hereby corrected as shown below:

Column 2, Line 39, change "normal direction" to --"normal direction"--.

Column 21, Line 65, change "tens" to --lens--.

Signed and Sealed this

Nineteenth Day of January, 2010

David J. Kappos
*Director of the United States Patent and Trademark Office*